(12) United States Patent
Asatani et al.

(10) Patent No.: US 7,057,861 B2
(45) Date of Patent: Jun. 6, 2006

(54) ELECTROMAGNETIC TRANSDUCER LAMINATE WITH DIFFERENT WIDTHS FOR THE SEMI-HARD MAGNETIC LAYER AND THE FIRST FERROMAGNETIC LAYER

(75) Inventors: Takashi Asatani, Tokyo (JP); Fujimi Kimura, Tokyo (JP)

(73) Assignee: TDK Corporation, Tokyo (JP)

( * ) Notice: Subject to any disclaimer, the term of this patent is extended or adjusted under 35 U.S.C. 154(b) by 375 days.

(21) Appl. No.: 10/624,685

(22) Filed: Jul. 23, 2003

(65) Prior Publication Data

US 2004/0037015 A1 Feb. 26, 2004

(30) Foreign Application Priority Data

Aug. 20, 2002 (JP) .............................. 2002-239456

(51) Int. Cl.
*G11B 5/39* (2006.01)

(52) U.S. Cl. ................................. 360/324.12

(58) Field of Classification Search ............ 360/324.12
See application file for complete search history.

(56) References Cited

U.S. PATENT DOCUMENTS

| | | | |
|---|---|---|---|
| 5,953,248 A * | 9/1999 | Chen et al. ................. | 365/158 |
| 5,966,012 A * | 10/1999 | Parkin ......................... | 324/252 |
| 5,966,323 A * | 10/1999 | Chen et al. ................. | 365/158 |
| 6,023,395 A * | 2/2000 | Dill et al. ................... | 360/324.2 |
| 6,153,320 A * | 11/2000 | Parkin ........................ | 428/811.2 |
| 6,166,948 A * | 12/2000 | Parkin et al. ............... | 365/173 |
| 6,292,389 B1 * | 9/2001 | Chen et al. ................. | 365/158 |
| 6,341,053 B1 * | 1/2002 | Nakada et al. ............. | 360/324.2 |
| 6,473,279 B1 * | 10/2002 | Smith et al. ................ | 360/324.12 |
| 2003/0235016 A1 * | 12/2003 | Gill .......................... | 360/324.12 |

FOREIGN PATENT DOCUMENTS

| | | |
|---|---|---|
| JP | A 10-284769 | 10/1998 |
| JP | A 2001-160640 | 6/2001 |
| JP | A 2001-168416 | 6/2001 |
| JP | A 2001-230470 | 8/2001 |
| JP | A 2003-092444 | 3/2003 |
| JP | A 2003-264324 | 9/2003 |
| JP | A 2003-338644 | 11/2003 |

* cited by examiner

*Primary Examiner*—A. J. Heinz
(74) *Attorney, Agent, or Firm*—Oliff & Berridge, PLC

(57) ABSTRACT

Provided is a magnetic reproducing apparatus capable of controlling a magnetic domain of a free layer, and obtaining a sufficient reproduction output even if the size of an MR device is reduced. The MR device is formed so as to have a laminate structure in which a semi-hard magnetic layer and a first ferromagnetic layer (free layer) are exchange-coupled to each other through a non-magnetic exchange coupling layer. Unlike an abutted junction structure using a hard magnetic layer, the distribution of a magnetic bias applied from the semi-hard magnetic layer to the first ferromagnetic layer becomes uniform, thereby the first ferromagnetic layer is brought into a single magnetic domain state. Moreover, the semi-hard magnetic layer has a moderate coercive force lying halfway between soft magnetism and hard magnetism, so the magnetization direction of the first ferromagnetic layer is not fixed. Therefore, the magnetization direction of the first ferromagnetic layer can be easily rotated, thereby a magnetoresistive ratio can be secured, so even if the size of the MR device is reduced, a sufficient reproduction output can be obtained.

25 Claims, 16 Drawing Sheets

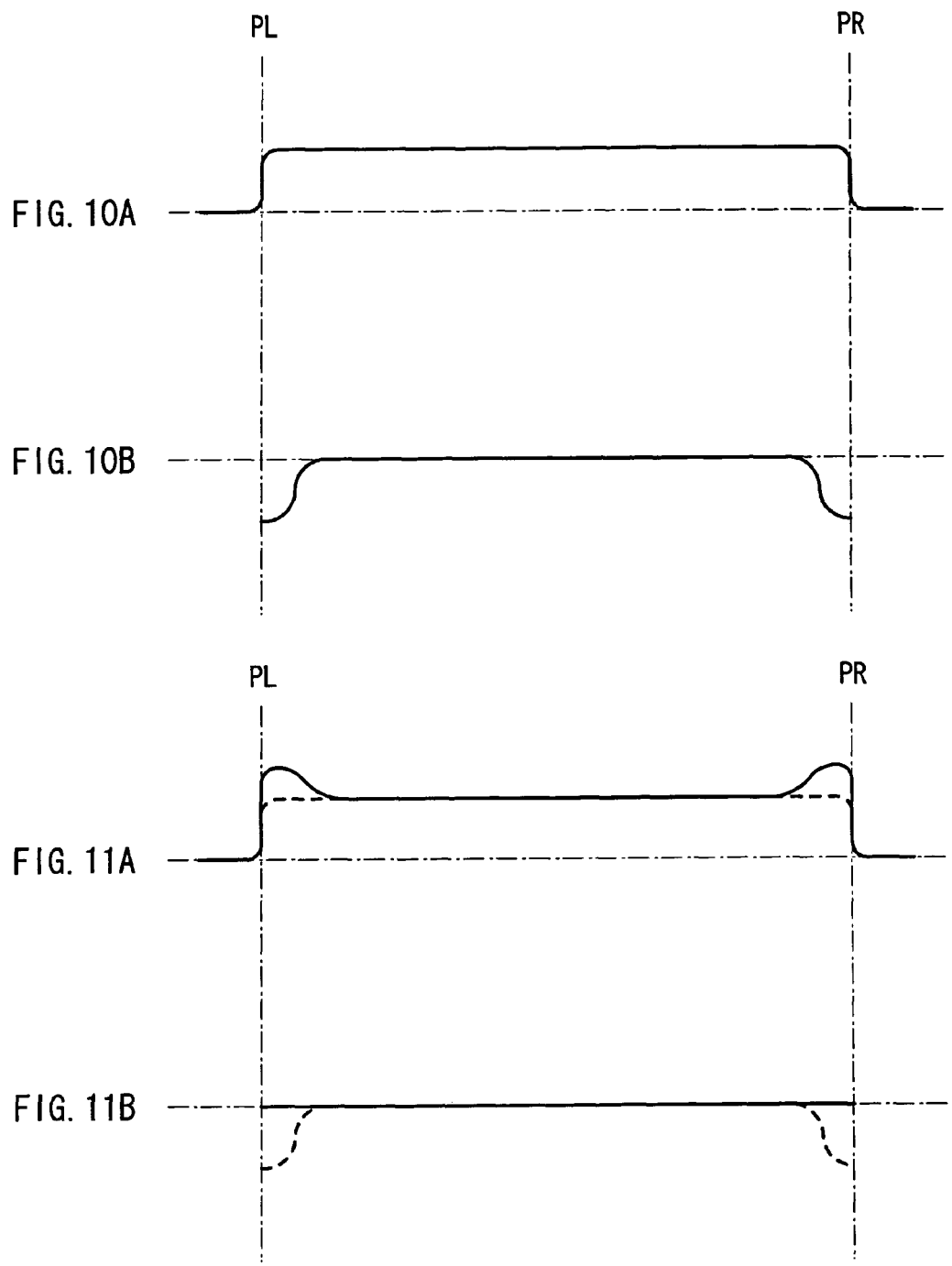

ELECTROMAGNETIC TRANSDUCER LAMINATE WITH DIFFERENT WIDTHS FOR THE SEMI-HARD MAGNETIC LAYER AND THE FIRST FERROMAGNETIC LAYER

BACKGROUND OF THE INVENTION

1. Field of the Invention

The present invention relates to an electromagnetic transducer laminate and an electromagnetic transducer which are used, for example, for converting a magnetic signal into an electric signal, a thin film magnetic head, a magnetic head assembly and a magnetic reproducing apparatus which magnetically reproduce information by using the electromagnetic transducer, and a method of manufacturing the electromagnetic transducer.

2. Description of the Related Art

In recent years, hard disk drives which magnetically record and reproduce information by using, for example, hard disks have been in widespread use as information recording/reproducing apparatuses. In the development of the hard disk drives, an improvement in performance of a thin film magnetic head has been sought in accordance with an increase in the areal density of a hard disk. The thin film magnetic head comprises, for example, an MR device which performs a reproducing process by using a magnetoresistive (MR) effect as a device for magnetic reproduction.

One of problems which arise in the development of the hard disk is that when the size of the MR device is reduced in accordance with an improvement in the areal density of the hard disk, a reproduction output declines resulting from a reduction in the physical size of the MR device. As a factor which causes a decline in the reproduction output, in addition to a reduction in the size of the MR device, for example, in a free layer functioning as a main part for detecting a signal magnetic field in the MR device, a discontinuous movement of a magnetic domain wall causes Barkhausen noise, so sensitivity of detecting the signal magnetic field by the free layer relatively declines. Therefore, in order to secure the reproduction output, it is necessary to eliminate the magnetic domain wall by bringing the free layer into a single magnetic domain state.

However, in a conventional hard disk drive, measures to control the magnetic domain of the free layer are not sufficient, so when the size of the MR device is reduced, it is difficult to obtain a sufficient reproduction output.

SUMMARY OF THE INVENTION

In view of the foregoing, it is a first object of the invention to provide an electromagnetic transducer laminate, an electromagnetic transducer, a thin film magnetic head, a magnetic head assembly and a magnetic reproducing apparatus which can obtain a sufficient reproduction output by controlling a magnetic domain of a free layer, even if the size of an MR device is reduced.

Moreover, it is a second object of the invention to provide a method of more easily manufacturing an electromagnetic transducer capable of contributing to securing a reproduction output.

An electromagnetic transducer laminate according to a first aspect of the invention comprises: a laminate structure including a first ferromagnetic layer having a pair of facing surfaces, a non-magnetic layer being disposed adjacent to one of the surfaces of the first ferromagnetic layer, a second ferromagnetic layer being disposed adjacent to the non-magnetic layer, and an antiferromagnetic layer being disposed to adjacent to the second ferromagnetic layer; a non-magnetic exchange coupling layer being disposed adjacent to the other surface of the first ferromagnetic layer; and a semi-hard magnetic layer being disposed adjacent to the non-magnetic exchange coupling layer, and being exchange-coupled to the first ferromagnetic layer through the non-magnetic exchange coupling layer.

An electromagnetic transducer laminate according to a second aspect of the invention comprises: a spin valve structure including a free layer, a non-magnetic layer being disposed adjacent to the free layer, a pinned layer being disposed so as to face the free layer with the non-magnetic layer in between, and having a magnetization direction fixed in a predetermined direction, and a pinning layer being disposed adjacent to the pinned layer, and being provided for fixing the magnetization direction of the pinned layer; a non-magnetic exchange coupling layer being disposed adjacent to the free layer on a side opposite to a side where the non-magnetic layer is disposed; and a magnetic domain control layer being disposed so as to face the free layer with the non-magnetic exchange coupling layer in between, and being exchange-coupled to the free layer so as to control a magnetic domain of the free layer.

An electromagnetic transducer laminate according to a third aspect of the invention comprises: a laminate structure including a first ferromagnetic layer having a pair of facing surfaces, a tunnel insulating layer being disposed adjacent to one of the surfaces of the first ferromagnetic layer, and being capable of tunneling conduction electrons therethrough, a second ferromagnetic layer being disposed adjacent to the tunnel insulating layer, and an antiferromagnetic layer being disposed adjacent to the second ferromagnetic layer; a non-magnetic exchange coupling layer being disposed adjacent to the other surface of the first ferromagnetic layer; and a semi-hard magnetic layer being disposed adjacent to the non-magnetic exchange coupling layer, and being exchange-coupled to the first ferromagnetic layer through the non-magnetic exchange coupling layer.

An electromagnetic transducer according to the invention comprises an electromagnetic transducer laminate according to any of the aspects of the invention; and a lead layer for supplying a current to the electromagnetic transducer laminate.

A thin film magnetic head according to the invention comprises: an electromagnetic transducer according to the invention wherein the thin film magnetic head magnetically reproduces information.

A magnetic head assembly according to the invention comprises: a head slider having a thin film magnetic head according to the invention formed thereon; and a slider supporting mechanism supporting the slider head.

A magnetic reproducing apparatus according to the invention comprises: a magnetic head assembly according to the invention; and a recording medium where information is magnetically reproduced by using the magnetic head assembly.

In the electromagnetic transducer laminate according to the first, the second and the third aspects of the invention, the electromagnetic transducer, the thin film magnetic head, the magnetic head assembly or the magnetic reproducing apparatus the semi-hard magnetic layer and the first ferromagnetic layer (free layer) are exchange-coupled to each other through the non-magnetic exchange coupling layer, so the first ferromagnetic layer (free layer) is brought into a single magnetic domain state.

In a method of manufacturing an electromagnetic transducer according to the invention, the electromagnetic transducer comprises an electromagnetic transducer laminate according to any of the aspects of the invention and a lead layer for supplying a current to the electromagnetic transducer laminate, and a method of manufacturing the electromagnetic transducer laminate comprises the steps of: forming a non-magnetic exchange coupling layer so as to be disposed adjacent to one surface of a first ferromagnetic layer, and forming a semi-hard magnetic layer so as to be disposed adjacent to the non-magnetic exchange coupling layer, thereby being exchange-coupled between the semi-hard magnetic layer and the first ferromagnetic layer through the non-magnetic exchange coupling layer.

In the method of manufacturing the electromagnetic transducer according to the invention, after the non-magnetic exchange coupling layer is formed so as to be disposed adjacent to one surface of the first ferromagnetic layer, the semi-hard magnetic layer is formed so as to be disposed adjacent to the non-magnetic exchange coupling layer. Thereby, the semi-hard magnetic layer and the first ferromagnetic layer are exchange-coupled to each other through the non-magnetic exchange coupling layer.

In the electromagnetic transducer laminate according to the first aspect of the invention, the semi-hard magnetic layer functions as a first magnetic domain control layer for controlling a magnetic domain of the first ferromagnetic layer.

Moreover, in the electromagnetic transducer laminate according to the first aspect of the invention, the width of the semi-hard magnetic layer is preferably equal to or larger than the width of the first ferromagnetic layer.

Further, in the electromagnetic transducer laminate according to the first aspect of the invention, the second ferromagnetic layer may have a laminate structure including two magnetization directions opposite to each other.

In the electromagnetic transducer laminate according to the first aspect of the invention, the non-magnetic exchange coupling layer may include a reflective layer for reflecting conduction electrons.

In the electromagnetic transducer laminate according to the first aspect of the invention, the non-magnetic exchange coupling layer may include an electrically conductive layer having a higher conductivity than the first ferromagnetic layer.

Moreover, it is preferable that the electromagnetic transducer according to the invention further comprises a hard magnetic layer being disposed adjacent to a side of at least a semi-hard magnetic layer in the electromagnetic transducer laminate, and functioning as a second magnetic domain control layer for controlling a magnetic domain of a first ferromagnetic layer in the electromagnetic transducer laminate.

Other and further objects, features and advantages of the invention will appear more fully from the following description.

BRIEF DESCRIPTION OF THE DRAWINGS

FIGS. 10A and 10B are illustrations for describing a correlation between a bias distribution and a magnetic orientation characteristic in a first ferromagnetic layer of an MR device not including a hard magnetic layer;

FIGS. 11A and 11B are illustrations for describing a correlation between a bias distribution and a magnetic orientation characteristic in a first ferromagnetic layer of an MR device including a hard magnetic layer;

DETAILED DESCRIPTION OF THE PREFERRED EMBODIMENTS

Preferred embodiments of the invention will be described in more detail below referring to the accompanying drawings.

Figure 1:
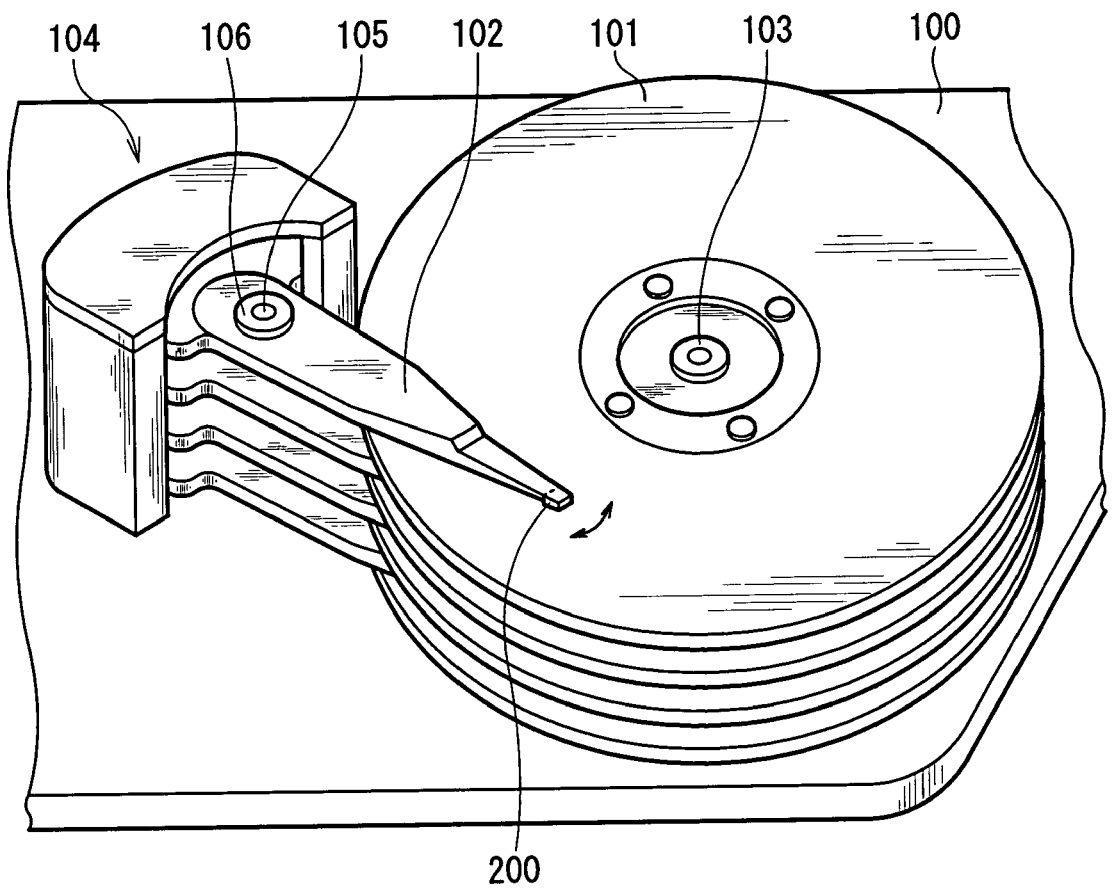
FIG. 1 is a perspective view of a main part of a hard disk drive according to an embodiment of the invention.

At first, referring to FIGS. 1 and 2, the structure of a hard disk drive as a magnetic reproducing apparatus according to an embodiment of the invention will be described below. FIG. 1 shows a main part of the hard disk drive, and FIG. 2 shows an enlarged view of a head slider shown in FIG. 1.

The hard disk drive can perform, for example, a recording process and a reproducing process, and, as shown in FIG. 1, the hard disk drive comprises a plurality of hard disks 101 on which information is magnetically recorded and a plurality of arms 102 each of which is disposed corresponding to each of the plurality of hard disks 101 and has a head slider 200 mounted on an end thereof. The hard disk 101 can rotate around a spindle motor 103 as a shaft. The arms 102 are supported by a driving portion 104 as a power source in a state where a fixed shaft 105 is inserted into the plurality of arms 102 through a bearing 106, so the plurality of arms 102 can pivot about the fixed shaft 105 as a center. Further, FIG. 1 shows, for example, a model in which the plurality of arms 102 can rotate as a unit. Among components of the hard disk drive shown in FIG. 1, a unit in which the head slider 200 is supported by each of the plurality of arms 102 is a so-called HGA (head gimbals assembly), and the unit corresponds to an example of "a magnetic head assembly" of the invention.

Figure 2:
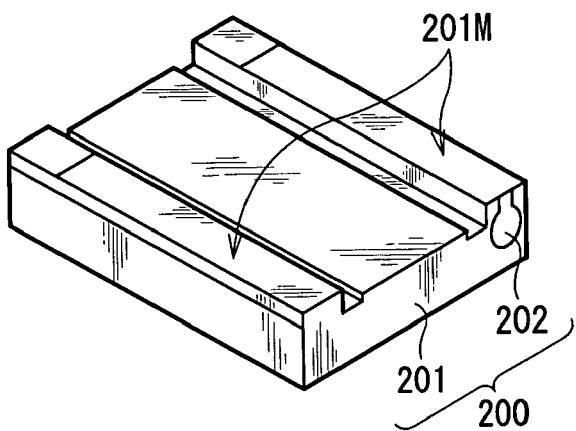
FIG. 2 is an enlarged perspective view of a head slider.

As shown in FIG. 2, the head slider 200 has a structure in which a substantially rectangular parallelepiped shaped base substrate 201 includes a groove portion for reducing air resistance generated when the arm 102 pivots, and a thin film magnetic head 202 performing a recording process and a reproducing process is formed on a side surface (a front side surface in FIG. 2) of the base substrate 201 perpendicular to a surface (air bearing surface) 201M facing the hard disk 101. When the hard disk 101 rotates during recording and reproducing information, an airflow is generated between a recording surface (a surface facing the head slider 200) of the hard disk 101 and the air bearing surface 201M, thereby the head slider 200 is slightly floated from the hard disk 101 by using the airflow. In order to easily show the structure of the base substrate 201 on a side closer to the air bearing surface 201M, the head slider 200 shown in FIG. 1 is turned upside down in FIG. 2.

Figure 3:
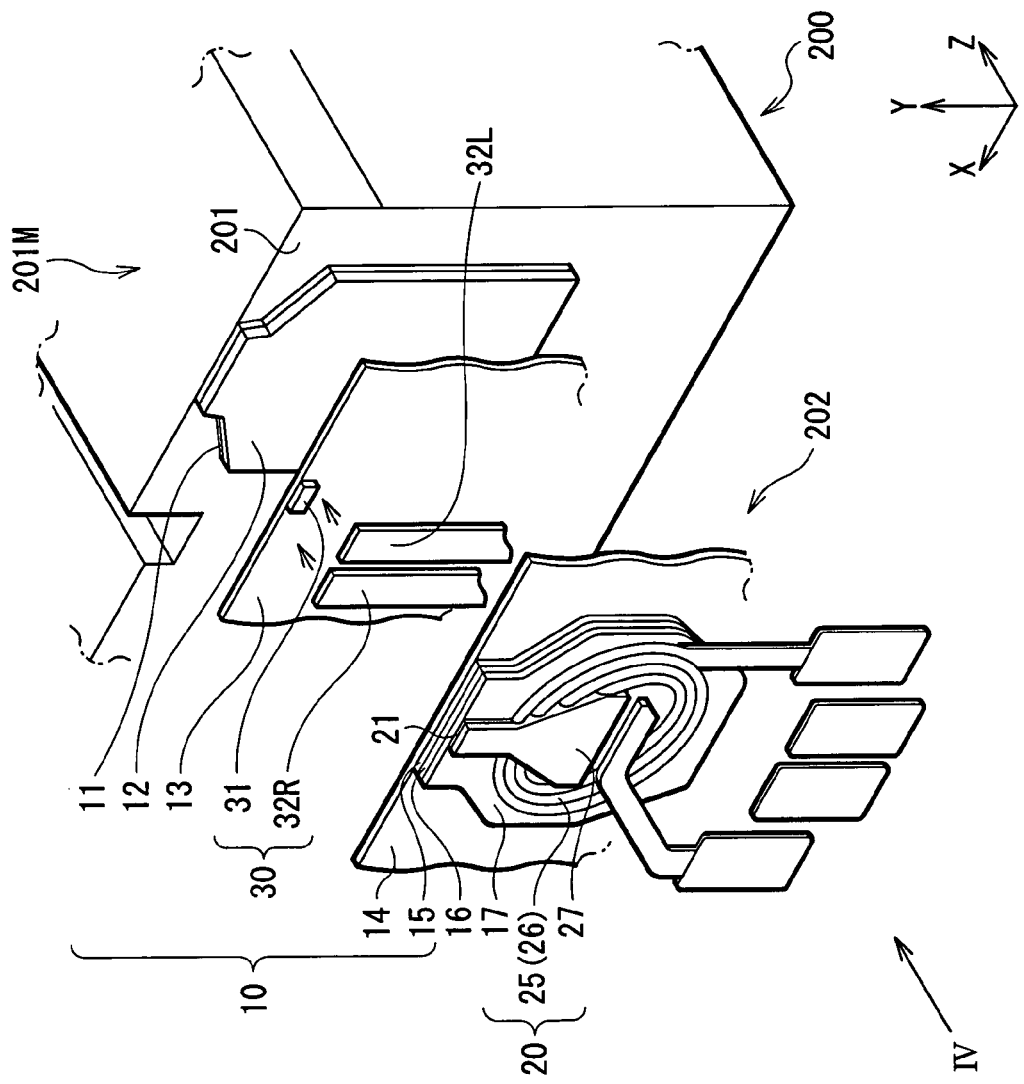
FIG. 3 is an exploded perspective view of a thin film magnetic head.
Figure 4:
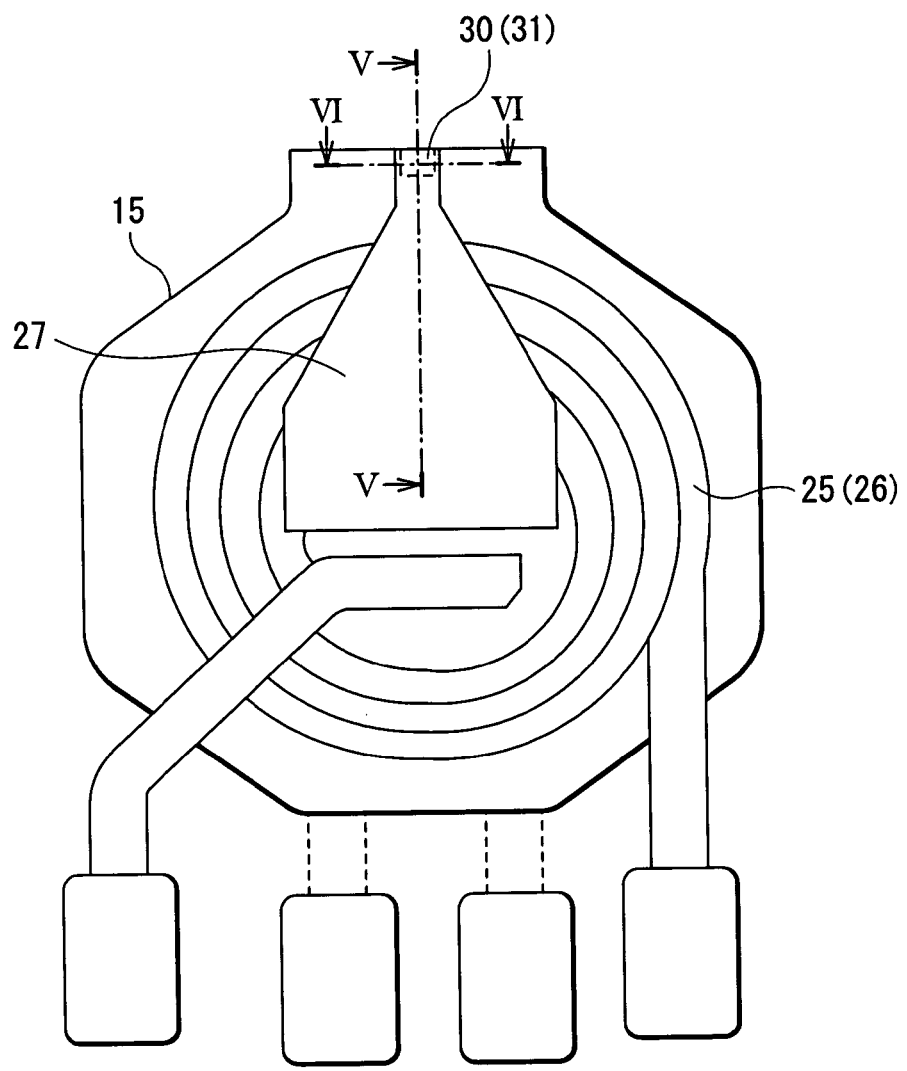
FIG. 4 is a plan view of the thin film magnetic head viewed from a direction IV indicated by an arrow in FIG. 3.
Figure 5:
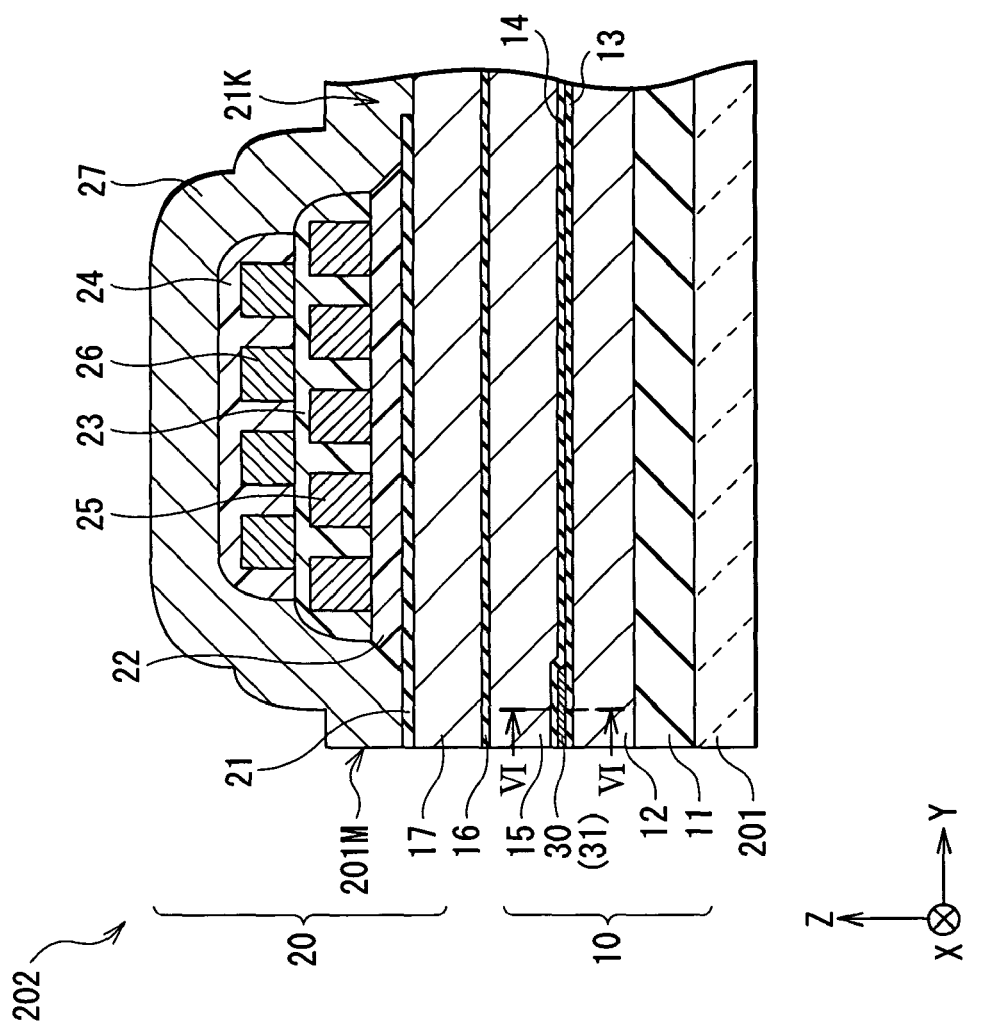
FIG. 5 is a sectional view of the thin film magnetic head taken along a line V—V of FIG. 4.

Next, referring to FIGS. 1 through 5, the thin film magnetic head 202 will be described in more detail below. FIGS. 3 through 5 show enlarged views of the thin film magnetic head 202, and FIG. 3 shows an exploded view, and FIG. 4 is a plan view from a direction indicated by an arrow IV in FIG. 3, and further FIG. 5 is a sectional view taken along a line V—V of FIG. 4.

The thin film magnetic head 202 is a composite head comprising a reproducing head portion 10 responsible for a magnetic reproducing process and a recording head portion 20 responsible for a magnetic recording process as a unit. The reproducing head portion 10 corresponds to an example of "an electromagnetic transducer" of the invention, and the thin film magnetic head 202 including the reproducing head portion 10 corresponds to "a thin film magnetic head" of the invention.

The reproducing head portion 10 is formed on, for example, the base substrate 201, and has a structure in which an insulating layer 11, a bottom shield layer 12, a bottom shield gap layer 13, a top shield gap layer 14 and a top shield layer 15 are laminated in this order, and an MR device 30 is buried between the bottom shield gap layer 13 and the top shield gap layer 14 so that an end surface of the MR device 30 is exposed to the air bearing surface 201M.

The insulating layer 11 is provided for electrically separating the reproducing head portion 10 from the base substrate 201, and is made of, for example, an insulating material such as aluminum oxide ($Al_2O_3$; hereinafter referred to as "alumina") or the like. The bottom shield layer 12 and the top shield layer 15 are provided for magnetically shielding the MR device 30, and are made of, for example, a magnetic material such as a nickel-iron alloy (NiFe; hereinafter referred to as "Permalloy (trade name)"). The bottom shield gap layer 13 and the top shield gap layer 14 are provided for magnetically and electrically separating the MR device 30 from its surroundings, and are made of, for example, a non-magnetic and non-conductive material such as alumina, aluminum nitride (AlN) or the like. The MR device 30 is provided for detecting a signal magnetic field of the hard disk 101 by using a magnetoresistive effect to magnetically reproduce information recorded on the hard disk 101, and includes a laminate 31 as a portion for detecting the signal magnetic field, and lead layers 32R and 32L for supplying a current to the laminate 31.

The recording head portion 20 is formed on, for example, the reproducing head portion 10 with a non-magnetic layer 16 in between, and has a structure in which a bottom pole 17 disposed adjacent to the non-magnetic layer 16, a write gap layer 21, two-layer thin film coils 25 and 26 buried in insulating layers 22, 23 and 24 (not shown in FIG. 3), and a top pole 27 are laminated in this order. The non-magnetic layer 16 is provided for magnetically separating between the reproducing head portion 10 and the recording head portion 20, and is made of, for example, alumina or the like.

The bottom pole 17 is provided for forming a magnetic path with the top pole 27, and is made of, for example, a material with a high saturation magnetic flux density such as Permalloy or the like. The write gap layer 21 is provided for forming a gap between the bottom pole 17 and the top pole 27, and is made of, for example, an insulating material such as alumina or the like. The insulating layers 22, 23 and 24 are provided for electrically separating the thin film coils 25 and 26 from their surroundings, and are made of, for example, an insulating material such as photoresist or the like. The thin film coils 25 and 26 have a spiral structure for generating a magnetic flux, and are made of, for example, a high-conductive material such as copper (Cu). An end of the thin film coil 25 and an end of the thin film coil 26 are connected to each other, and a pad for passing a current therethrough is attached to the other end of each of the thin film coils 25 and 26. The top pole 27 is provided mainly for containing a magnetic flux generated in the thin film coils 25 and 26, and generating a magnetic field for recording in the neighborhood of the write gap layer 21 by use of the magnetic flux. The top pole 27 is made of, for example, a material with a high saturation magnetic flux density such as Permalloy, iron nitride (FeN) or the like. The top pole 27 is magnetically connected to the bottom pole 17 through an opening 21K disposed in the write gap layer 21. In addition, an overcoat layer (not shown) for electrically separating the recording head portion 20 from its surroundings is formed on the top pole 27.

Figure 6:
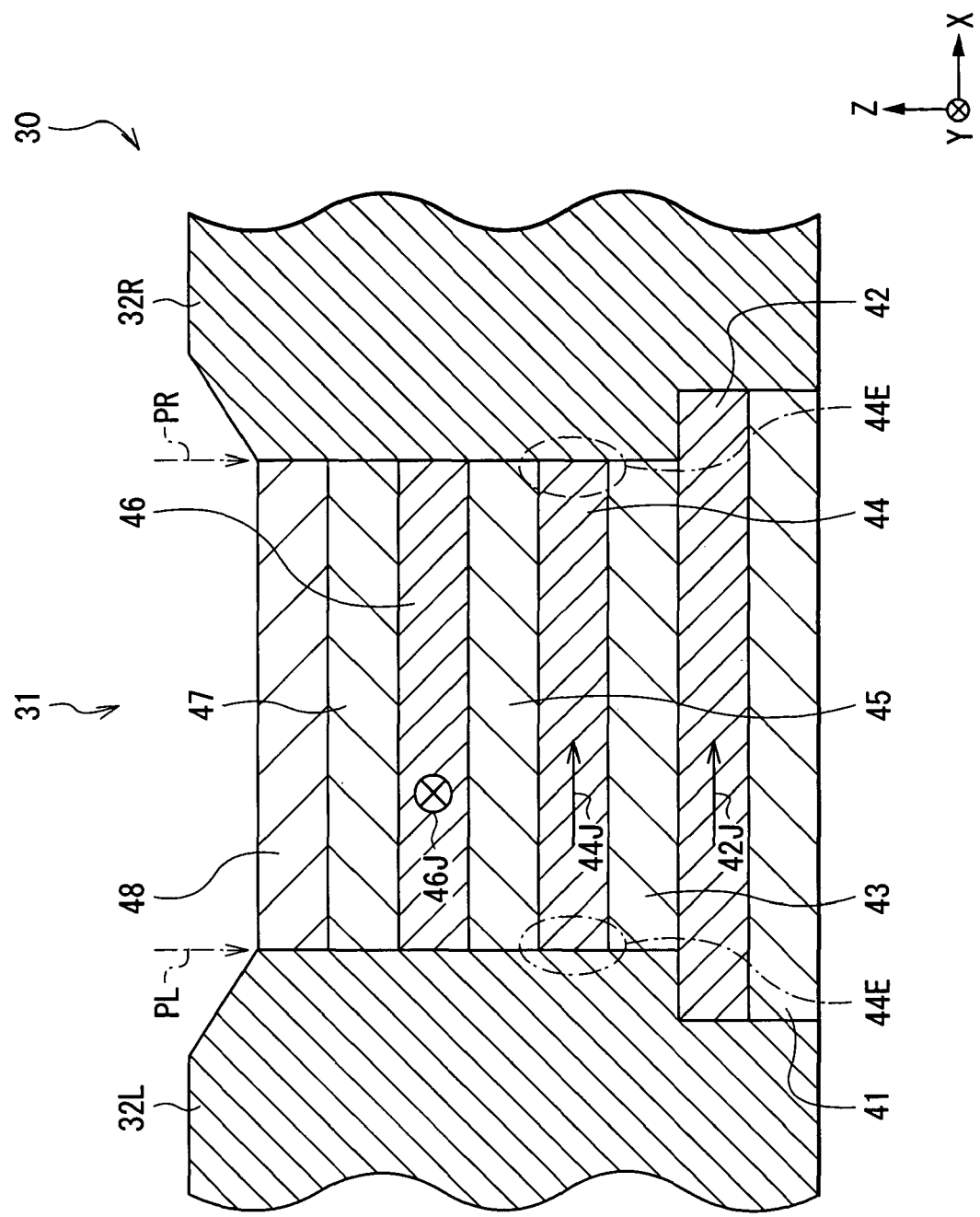
FIG. 6 is a sectional view of an MR device taken along a line VI—VI of FIG.4.

Next, referring to FIGS. 3 through 6, the structure of the MR device 30 will be described in more detail below. FIG. 6 is an enlarged sectional view of the MR device 30 taken along a line VI—VI of FIGS. 4 and 5.

As shown in FIG. 6, the MR device 30 has a structure in which two lead layers 32R and 32L are connected to both sides of the laminate 31. The laminate 31 has a top type structure in which a base layer 41, a semi-hard magnetic layer 42, a non-magnetic exchange coupling layer 43, a first ferromagnetic layer 44, a non-magnetic layer 45, a second ferromagnetic layer 46, an antiferromagnetic layer 47 and a cap layer 48 are laminated in this order, and the first ferromagnetic layer 44 is disposed on a side closer to the base layer 41, and the second ferromagnetic layer 46 is disposed on a side farther from the base layer 41. In the laminate 31, a laminate structure including the first ferromagnetic layer 44, the non-magnetic layer 45, the second ferromagnetic layer 46 and the antiferromagnetic layer 47 is generally called a spin-valve structure. The laminate 31 constituting the MR device 30 corresponds to an example of "an electromagnetic transducer laminate" in the invention.

The components of the laminate 31 except for the semi-hard magnetic layer 42 and the non-magnetic exchange coupling layer 43 will be described below, and then the semi-hard magnetic layer 42 and the non-magnetic exchange coupling layer 43 which are characteristic parts of the MR device 30 according to the embodiment will be described below.

The base layer 41 is provided for stabilizing magnetic properties of the semi-hard magnetic layer 42 disposed on the base layer 41. The base layer 41 is made of, for example, tantalum (Ta), a nickel-iron-chromium alloy (NiFeCr), a nickel-chromium alloy (NiCr) or the like with a thickness of approximately 5.0 nm.

The first ferromagnetic layer 44 is a magnetic sensitive layer which is a so-called "free layer", and a magnetization direction 44J of the first ferromagnetic layer 44 can be rotated according to the signal magnetic field of the hard disk 101. The first ferromagnetic layer 44 is made of, for example, a ferromagnetic material such as Permalloy, a cobalt-iron alloy (CoFe) or the like with a thickness of approximately 3.0 nm. The first ferromagnetic layer 44 is specifically exchange-coupled to the semi-hard magnetic layer 42 through the non-magnetic exchange coupling layer 43, and is brought into a single magnetic domain state in a condition where an external magnetic field is zero, so the magnetization direction 44J is oriented in a longitudinal direction.

The non-magnetic layer 45 is made of, for example, a non-magnetic material such as copper, silver, gold, ruthenium (Ru) or the like with a thickness of approximately 2.0 nm.

The second ferromagnetic layer 46 is a so-called "pinned layer", and is exchange-coupled to the antiferromagnetic layer 47 so as to fix a magnetization direction 46J of the second ferromagnetic layer 46 in a lateral direction. The second ferromagnetic layer 46 is a synthetic pinned layer with, for example, a laminate structure having two magnetization directions opposite to each other. Further, the second ferromagnetic layer 46 has a structure in which two ferromagnetic layers are laminated with a non-magnetic layer in between. More specifically, the second ferromagnetic layer 46 includes, for example, a cobalt-iron alloy layer (with a thickness of approximately 2.0 nm), a ruthenium layer (with a thickness of approximately 1.0 nm) and a cobalt-iron alloy layer (with a thickness of approximately 2.0 nm) laminated in order. In addition, the second ferromagnetic layer 46 does not necessarily have a laminate structure (synthetic pinned layer), and may have a single layer structure.

The antiferromagnetic layer 47 is a so-called "pinning layer", and is provided for fixing the magnetization direction 46J of the second ferromagnetic layer 46. The antiferromagnetic layer 47 is made of, for example, an alloy such as a platinum-manganese alloy (PtMn), an iridium-manganese alloy (IrMn), a ruthenium-rhodium-manganese alloy (RuRhMn) or the like, or a metal oxide such as nickel oxide or the like with a thickness of approximately 10.0 nm.

The cap layer 48 is provided for protecting a main part of the laminate 31 from physical and chemical damage. The cap layer 48 is made of, for example, tantalum, rhodium (Rh), a nickel-chromium alloy or the like with a thickness of approximately 2.0 nm.

The semi-hard magnetic layer 42 which is a characteristic part of the laminate 31 is provided for applying a magnetic bias uniformly oriented in a longitudinal direction to the first ferromagnetic layer 44 in order to control a magnetic domain of the first ferromagnetic layer 44 through using exchange coupling by a RKKY interaction. The "RKKY interaction" is an indirect exchange interaction using spin polarization of conduction electrons as a medium, and is named from the initials of four people, that is, Ruderman and Kittel who have proposed an exchange interaction between nuclear spins through the medium of conduction electrons, and Kasuya and Yoshida who have extended the issue to rare earths and transition metals. The semi-hard magnetic layer 42 is made of, for example, a semi-hard magnetic material having a moderate coercive force lying halfway between a soft magnetic material and a hard magnetic material, such as nickel (Ni), a nickel-cobalt alloy (NiCo), a nickel-cobalt-iron-chromium-rhodium alloy (NiCoFeCrRh) or the like with a thickness of approximately 5.0 mm More specifically, for example, the semi-hard magnetic material of the semi-hard magnetic layer 42 preferably has as large a anisotropic magnetic field Hk as the magnetic domain of the first ferromagnetic layer 44 can be controlled, and has a magnetostriction coefficient of $\gamma<0$ so as to stably fix a magnetization direction 42J of the semi-hard magnetic layer 42 in a longitudinal direction. A main reason why the semi-hard magnetic layer 42 needs to have a moderately large anisotropic magnetic field Hk is as follows. When the anisotropic magnetic field Hk is too small, the magnetization direction 42J is easily rotated according to the signal magnetic field of the hard disk 101, so the signal magnetic field cannot be sufficiently conducted to the first ferromagnetic layer 44. On the other hand, when the anisotropic magnetic field Hk is too large, exchange coupling becomes stronger than necessary, so it is difficult to rotate the magnetization direction 44J of the first ferromagnetic layer 44. Therefore, either case causes a decline in the reproduction output. For example, the width in a longitudinal direction (left to right direction in FIG. 6) of the semi-hard magnetic layer 42 is equal to or larger than the width in a longitudinal direction of a top portion including the first ferromagnetic layer 44 in the laminate 31, and more specifically, the width of the semi-hard magnetic layer 42 is larger than the width of the top portion including the first ferromagnetic layer 44. Herein, the semi-hard magnetic layer 42 corresponds to an example of "a first magnetic domain control layer" and "a magnetic domain control layer" in the invention. As should be appreciated, the longitudinal direction is a so-called read width direction.

The non-magnetic exchange coupling layer 43 is made of, for example, a non-magnetic material such as metal, for example, copper, silver (Ag), gold (Au), bismuth (Bi) or the like, a metal oxide, for example, magnesium oxide (MgO), nickel oxide (NiO), copper oxide (CuO), cobalt oxide (CoO) or the like, a semiconductor, for example, zinc sulfide (ZnS), zinc selenide (ZnSe), gallium nitride (GaN), gallium arsenide (GaAs), silicon (Si) or the like. The thickness of the non-magnetic exchange coupling layer 43 is approximately 1.5 nm to 2.0 nm, and more preferably approximately 2.0 nm. Moreover, for example, the non-magnetic material of the non-magnetic exchange coupling layer 43 preferably has characteristics similar to the crystalline structure and the lattice constant of the first ferromagnetic layer 44.

Next, referring to FIGS. 1 through 6, actions of the hard disk drive will be described below.

In the hard disk drive, during recording and reproducing information, the arm 102 pivots around the fixed shaft 105 as a center, and the head slider 200 mounted on an front end of the arm 102 faces a recording surface of the hard disk 101 so as to perform recording and reproducing on the hard disk 101 by the thin film magnetic head 202 formed on the head slider 200.

More specifically, during recording information, when a current flows through the thin film coils 25 and 26 of the recording head portion 20 through an external circuit (not shown), a magnetic flux is generated in the thin film coils 25 and 26. After the magnetic flux generated at this time is contained mainly in the top pole 27, the magnetic flux is emitted from the air bearing surface 201M, thereby a magnetic field for recording is generated in the neighborhood of the write gap layer 21. The recording surface is magnetized based upon the magnetic field for recording so as to magnetically record information on the hard disk 101.

On the other hand, during reproducing information, a magnetic reproducing process is performed by the MR device 30 of the reproducing head portion 10. More specifically, in the MR device 30, before reproducing information, the magnetization direction 46J of the second ferromagnetic layer 46 is fixed in a lateral direction based upon exchange coupling between the second ferromagnetic layer 46 and the antiferromagnetic layer 47, and the magnetization direction 44J of the first ferromagnetic layer 44 is oriented in a longitudinal direction based upon exchange coupling between the semi-hard magnetic layer 42 and the first ferromagnetic layer 44. During reproducing information, when a detecting current (sense current) is supplied to the laminate 31 through the lead layers 32R and 32L, the sense current mainly flows through the first ferromagnetic layer 44 in the laminate 31. When the first ferromagnetic layer 44 detects the signal magnetic field of the hard disk 101, and the magnetization direction 44J thereof is rotated, a resistance corresponding to a relative angle between the magnetization direction 44J of the first ferromagnetic layer 44 and the magnetization direction 46J of the second ferromagnetic layer 46 has an effect on conduction electrons flowing through the laminate 31. The resistance of the laminate 31 at this time changes depending upon a magnitude of the signal magnetic field (magnetoresistive effect). A change in the resistance of the laminate 31 is detected as a change in voltage by using the magnetoresistive effect so as to magnetically reproduce information recorded on the hard disk 101.

Next, characteristic effects of the MR device 30 will be described below.

In the MR device 30 according to the embodiment, the semi-hard magnetic layer 42 is included in the laminate 31 so as to carry out exchange coupling between the semi-hard magnetic layer 42 and the first ferromagnetic layer 44 through the non-magnetic exchange coupling layer 43, so the magnetic domain of the first ferromagnetic layer 44 can be controlled, and even if the size of the MR device 30 is reduced, a sufficient reproduction output can be obtained, because of the following reasons.

Figure 7:
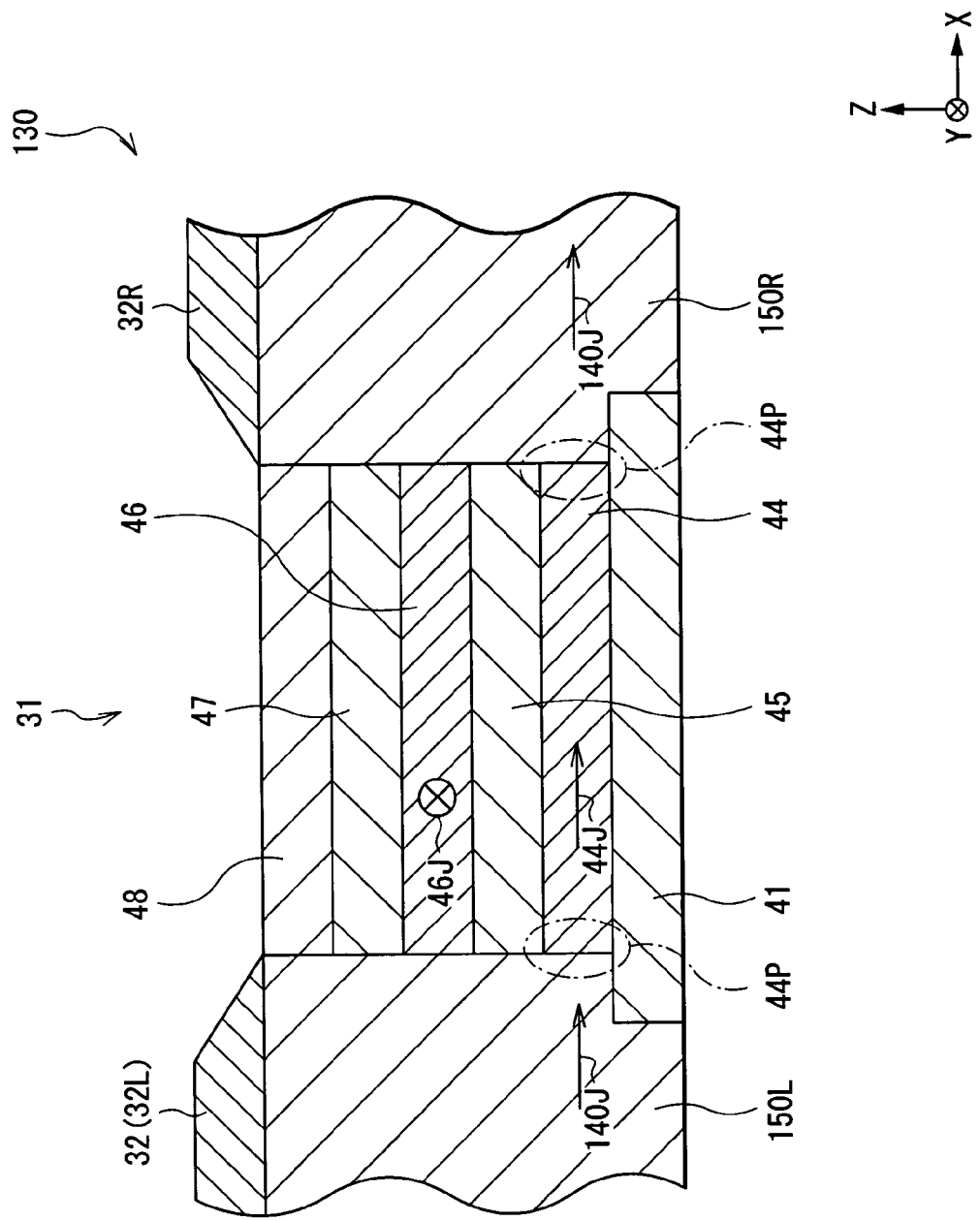
FIG. 7 is a sectional view of an MR device as a comparative example relative to the MR device constituting the hard disk drive according to the embodiment of the invention.

As a common structure for controlling the magnetic domain of the first ferromagnetic layer 44, for example, as in the case of an MR device 130 as a comparative example shown in FIG. 7, instead of the semi-hard magnetic layer 42 and the non-magnetic exchange coupling layer 43, two hard magnetic layers 150R and 150L are disposed adjacent to the laminate 31 in a longitudinal direction so as to control the magnetic domain of the first ferromagnetic layer 44. The structure of the MR device 130 is generally called as "abutted junction structure". In the abutted junction type MR device 130, a magnetic bias in a longitudinal direction is supplied to the first ferromagnetic layer 44 from the hard magnetic layers 150R and 150L, then the magnetization direction 44J of the first ferromagnetic layer 44 is oriented in a longitudinal direction based upon the magnetic bias, so the magnetic reproducing process can be performed by the same action mechanism as that of the MR device 30 according to the embodiment.

However, in the abutted junction type MR device 130, the distribution of the magnetic bias applied from the hard magnetic layers 150R and 150L to the first ferromagnetic layer 44 becomes nonuniform, so it is difficult to bring the first ferromagnetic layer 44 into a single magnetic domain state. In other words, in the MR device 130, two hard magnetic layers 150R and 150L made of a hard magnetic material with a high coercive force are locally disposed on both ends of the first ferromagnetic layer 44, so the magnetic bias is concentrated on portions 44P of the first ferromagnetic layer 44 in the neighborhood of an adjacent interface contact with the hard magnetic layers 150R and 150L (hereinafter referred to as "adjacent interface neighborhood portion"). Thereby, in the first ferromagnetic layer 44, the magnetization direction 44J can be rotated according to the signal magnetic field in a portion except for the adjacent interface neighborhood portions 44P, but on the other hand, the magnetization direction 44J is fixed in the adjacent interface neighborhood portions 44P, so the magnetization direction 44J cannot be rotated. The adjacent interface neighborhood portions 44P becomes an insensitive area where the signal magnetic field cannot be detected in effects. Therefore, in the MR device 130, a sufficient magnetoresistive ratio cannot be obtained resulting from the presence of the insensitive area, so it is difficult to obtain a sufficient reproduction output. When the size of the MR device 130 is reduced according to an improvement in the areal density of the hard disk, the problem relating to the reproduction output specifically becomes pronounced.

On the other hand, in the MR device 30 according to the embodiment, the semi-hard magnetic layer 42 is included in the laminate 31, so the distribution of the magnetic bias applied from the semi-hard magnetic layer 42 to the first ferromagnetic layer 44 becomes uniform, so the whole first ferromagnetic layer 44 is brought into a single magnetic domain state. In other words, in the MR device 30, unlike the MR device 130 in which the hard magnetic layers 150R and 150L are locally disposed on both sides of the first ferromagnetic layer 44, the semi-hard magnetic layer 42 faces the first ferromagnetic layer 44 with the non-magnetic exchange coupling layer 43 in between, so the magnetic bias is almost uniformly applied from the semi-hard magnetic layer 42 to the whole first ferromagnetic layer 44. In this case, the magnetization direction 44J of the whole first ferromagnetic layer 44 can be rotated, so no insensitive area is produced. Further, the semi-hard magnetic layer 42 has a coercive force halfway between soft magnetism and hard magnetism, so even if the semi-hard magnetic layer 42 is disposed close to the first ferromagnetic layer 44 with the non-magnetic exchange coupling layer 43 with an extremely thin thickness in between, the magnetization direction 44J of the first ferromagnetic layer 44 is not fixed. Thereby, the magnetization direction 44J of the first ferromagnetic layer 44 is oriented in a longitudinal direction when the signal magnetic field is zero, and the magnetization direction 44J can be rotated according to the signal magnetic field when necessary. Therefore, in the embodiment, the magnetization direction 44J of the first ferromagnetic layer 44 can be easily rotated, thereby the magnetoresistive ratio can be secured, so even if the size of the MR device 30 is reduced, a sufficient reproduction output can be obtained.

Particularly, in the embodiment, the semi-hard magnetic layer 42 is used as a means to control the magnetic domain, so in the viewpoint of microscopic magnetic domain control relating to the first ferromagnetic layer 44, the reproduction output can be secured. More specifically, when the hard magnetic layers 150R and 150L are used as means to control the magnetic domain, the microscopic magnetic domain state of the first ferromagnetic layer 44 does not become uniform, because in the hard magnetic layers 150R and 150L, in a nonuniform structure in which grain boundaries or a large variety of materials are aligned in a mosaic pattern, a magnetic domain wall is fixed so as to maintain a high coercive force, and when microscopically viewed, the magnetization is nonuniform, so a variation in exchange coupling can result. On the other hand, in the semi-hard magnetic layer 42 having a lower coercive force than the hard magnetic layers 150R and 150L, the microscopic magnetization becomes substantially uniform, thereby exchange coupling becomes substantially uniform. Therefore the reproduction output can be secured.

Moreover, in the embodiment, the width in the longitudinal direction of the semi-hard magnetic layer 42 is equal to or larger than the width in the longitudinal direction of the first ferromagnetic layer 44, so the whole first ferromagnetic layer 44 faces the semi-hard magnetic layer 42, and the magnetic bias is applied from the semi-hard magnetic layer 42 to the whole first ferromagnetic layer 44. Therefore, unlike the case where the width of the semi-hard magnetic layer 42 is smaller than the width of the first ferromagnetic layer 44, and both end neighborhood portions of the first ferromagnetic layer 44 do not face the semi-hard magnetic layer 42, no portion where the magnetic bias is difficult to be supplied in the first ferromagnetic layer 44 is produced, so the bias distribution of the first ferromagnetic layer 44 can become uniform.

In addition, in the embodiment, as long as a sufficient reproduction output can be obtained by using exchange coupling between the semi-hard magnetic layer 42 and the first ferromagnetic layer 44 as described above, the structure of the MR device 30 can be freely modified as described below with examples.

<<Modification 1>>

Figure 8:
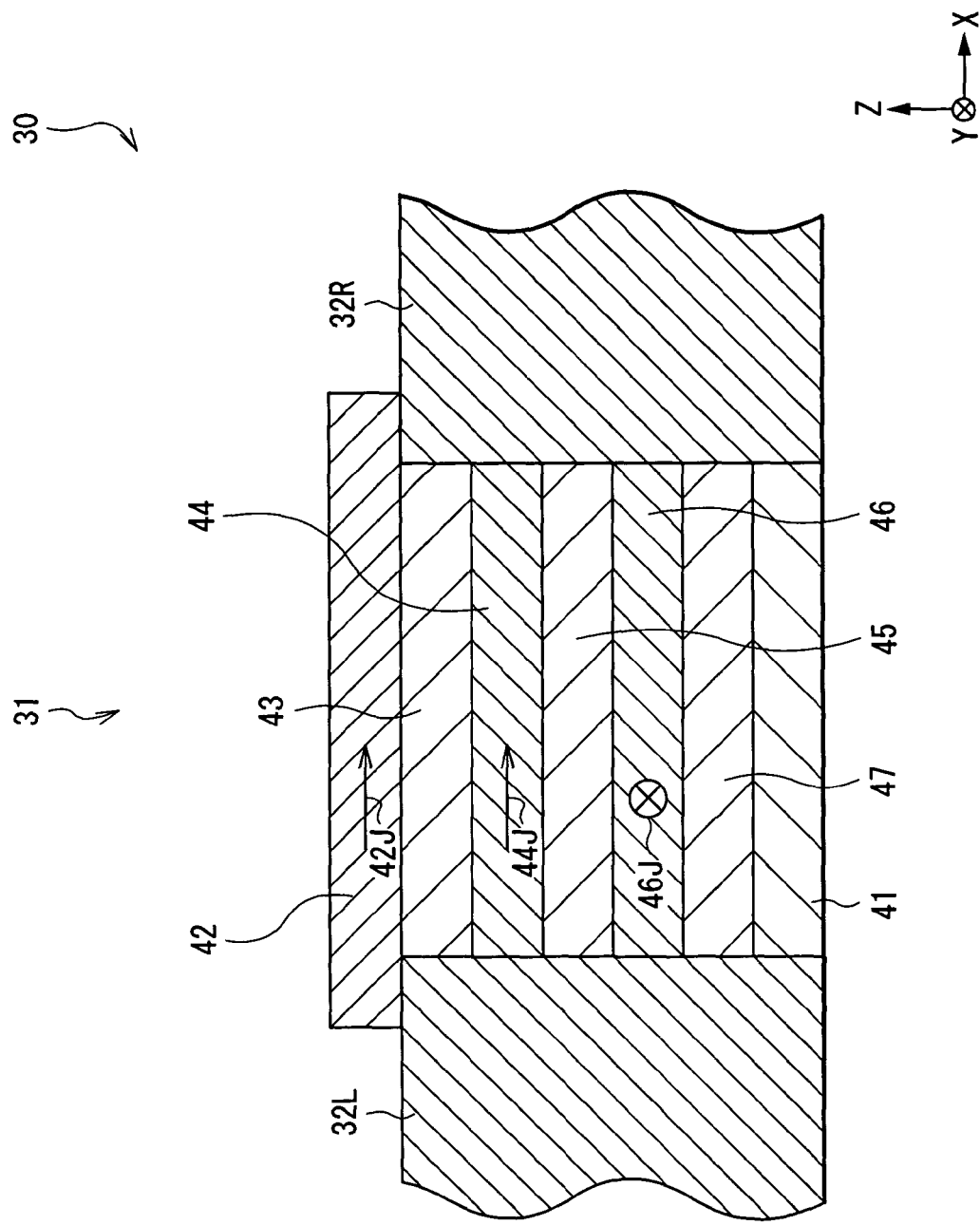
FIG. 8 is a sectional view of a first modification (bottom type structure) of the MR device according to the embodiment of the invention.

More specifically, for example, in the embodiment, the MR device 30 has the top type structure in which the first ferromagnetic layer 44 is disposed on a side closer to the base layer 41, and the second ferromagnetic layer 46 is disposed on a side farther from the base layer 41, but the MR device 30 does not necessarily has the top type structure, and as shown in FIG. 8, the MR device 30 may have a bottom type structure in which the first ferromagnetic layer 44 is disposed on a side farther from the base layer 41 and the second ferromagnetic layer 46 is disposed on a side closer to the base layer 41. In a specific structure of the laminate 31 in the bottom type MR device 30, the antiferromagnetic layer 47, the second ferromagnetic layer 46, the non-magnetic layer 45, the first ferromagnetic layer 44, the non-magnetic exchange coupling layer 43 and the semi-hard magnetic layer 42 are laminated in this order on the base layer 41, and, for example, the lead layers 32R and 32L are connected to a laminate portion from the base layer 41 to the non-magnetic exchange coupling layer 43 in the laminate 31.

<<Modification 2>>

Figure 9:
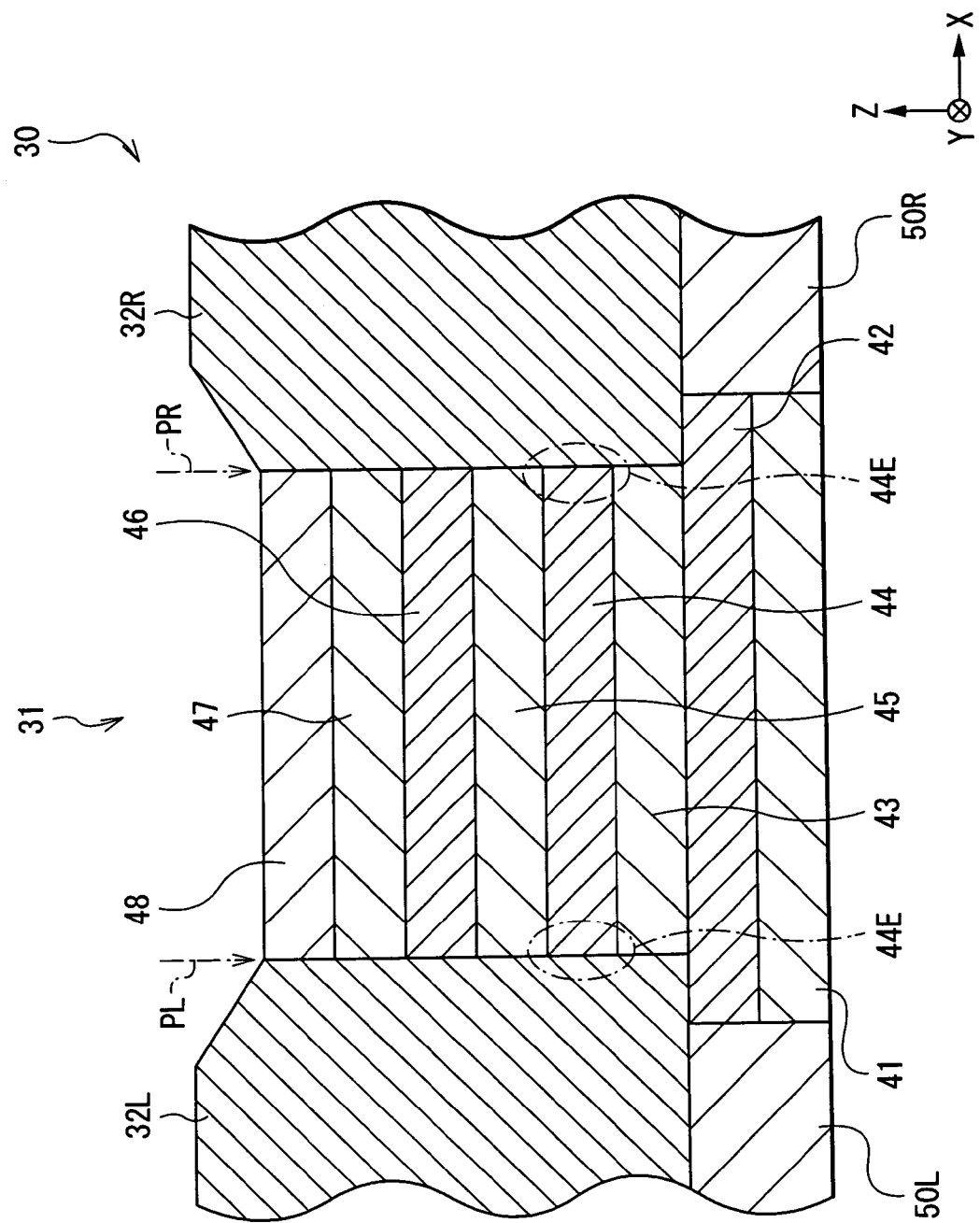
FIG. 9 is a sectional view of a second modification (abutted junction structure) of the MR device according to the embodiment of the invention.

Moreover, for example, as shown in FIG. 9, the MR device 30 may have an abutted junction structure in which hard magnetic layers 50R and 50L are disposed adjacent to, for example, a laminate portion including the base layer 41 an the semi-hard magnetic layer 42 in the laminate 31 in a longitudinal direction. The reason why the hard magnetic layers 50R and 50L are disposed adjacent to only the laminate portion including the base layer 41 and the semi-hard magnetic layer 42 is to prevent a problem specific to the abutted junction type MR device 130 shown in FIG. 7, that is, to prevent the magnetic bias by the hard magnetic layers 150R and 150L from nonuniformly having an influence on the first ferromagnetic layer 44 to produce an insensitive area in the first ferromagnetic layer 44.

In the abutted junction type MR device 30 shown in FIG. 9, the magnetic orientation of the whole first ferromagnetic layer 44 becomes uniform, so the reproduction output can be stabilized. The reason will be described below.

FIGS. 10A, 10B, 11A and 11B show illustrations for describing a correlation between a bias distribution and a magnetic orientation characteristic in the first ferromagnetic layer 44. FIGS. 10A and 10B show the correlation in the first ferromagnetic layer 44 with a structure not including the hard magnetic layers 50R and 50L (refer to FIG. 6), and FIGS. 11A and 11B show the correlation in the ferromagnetic layer 44 with a structure including the hard magnetic layers 50R and 50L as a modification (refer to FIG. 9). Moreover, in the drawings, FIGS. 10A and 11A show an amount of the magnetic bias, and FIGS. 10B and 11B show an intensity Hex of an exchange coupling magnetic field. Further, PR and PL correspond to an end (right end) position PR and the other end (left end) position PL of the first ferromagnetic layer 44 shown in FIGS. 6 and 9, respectively.

In the MR device 30 with the structure shown in FIG. 6, for example, as shown in FIG. 10A, even if a strong magnetic bias is uniformly supplied from the semi-hard magnetic layer 42 to the first ferromagnetic layer 44 all the way from the end position PR to the other end position PL so that the bias distribution in the first ferromagnetic layer 44 becomes uniform, as shown in FIG. 10B, there may be cases where in portions 44E adjacent to the end position PR and the other end position PL of the first ferromagnetic layer 44, the exchange coupling magnetic field is not sufficient, so a sufficient magnetic orientation cannot be obtained. Hereinafter the portions 44E is referred to as "both end adjacent portions".

On the other hand, in the abutted junction type MR device 30 shown in FIG. 9, a strong magnetic bias is uniformly supplied from the semi-hard magnetic layer 42 to the first ferromagnetic layer 44, and a weak magnetic bias is selectively and additionally supplied from the hard magnetic layers 50R and 50L to the both end adjacent portions 44E of the first ferromagnetic layer 44. Thereby, as shown in FIG. 11A, the amount of the magnetic bias is partially increased in the neighborhood of the end position PR and the other end position PL of the first ferromagnetic layer 44, and the bias distribution intentionally becomes nonuniform so that the magnetic bias exerts a strong influence on the both end adjacent portions 44E. Thereby, as shown in FIG. 1B, the exchange coupling magnetic field in the both end adjacent portions 44E is partially increased, and the property of the magnetic orientation of the first ferromagnetic layer 44 becomes uniform all the way from the end portion PR to the other end position PL. Therefore, in the abutted junction type MR device 30, the reproduction output is stabilized.

Figure 12:
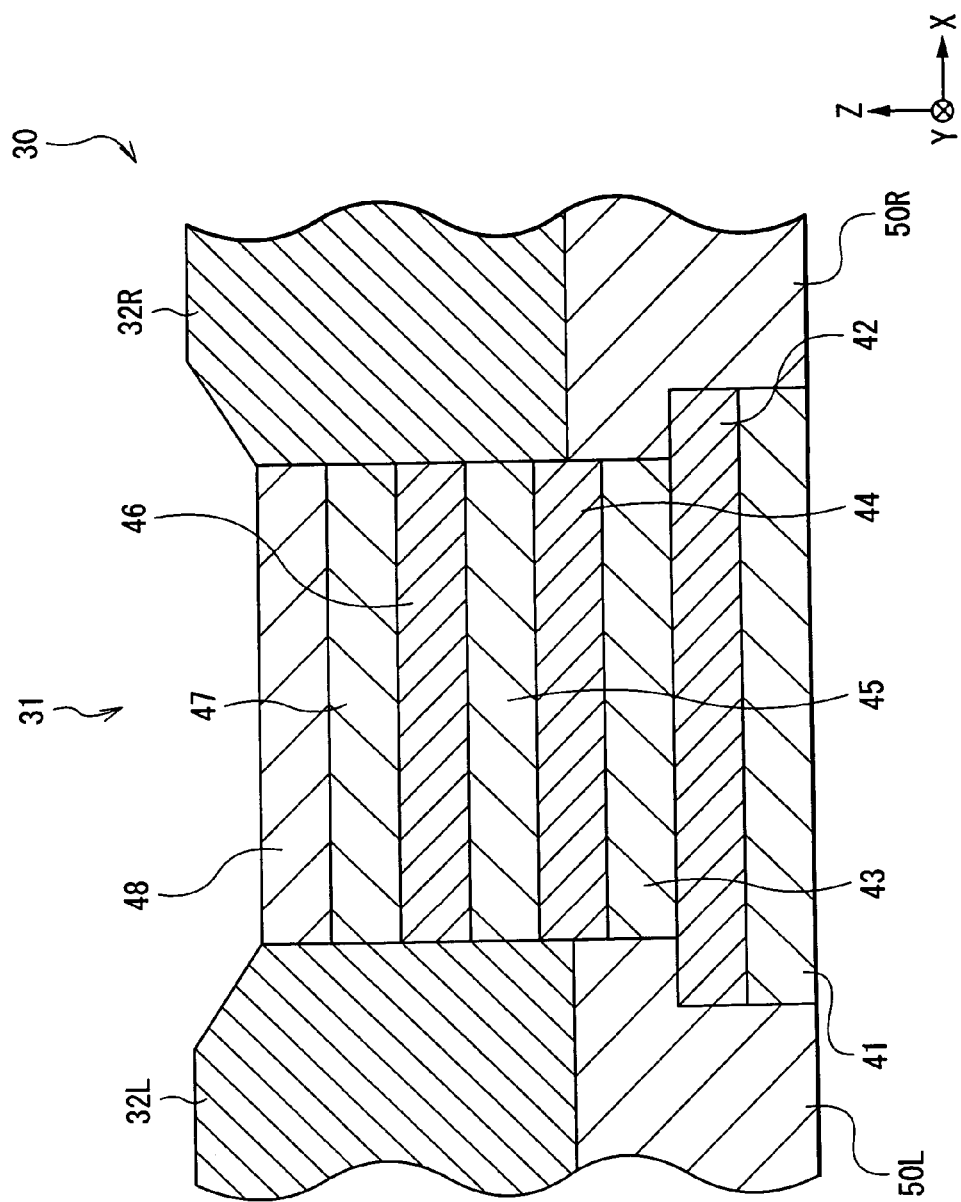
FIG. 12 is a sectional view of another modification of the MR device shown in FIG. 9.

Moreover, when the MR device 30 has the abutted junction structure, the hard magnetic layers 50R and 50L are not necessarily disposed adjacent to the laminate portion including the base layer 41 and the semi-hard magnetic layer 42, and as long as the insensitive area is not produced, a range where the hard magnetic layers 50R and 50L are disposed adjacent to the laminate 31 can be freely modified. More specifically, for example, as shown in FIG. 12, the hard magnetic layers 50R and 50L may be disposed adjacent to a laminate portion from the base layer 41 to a middle point of the first ferromagnetic layer 44 in the laminate 31.

<<Modification 3>>

Figure 13:
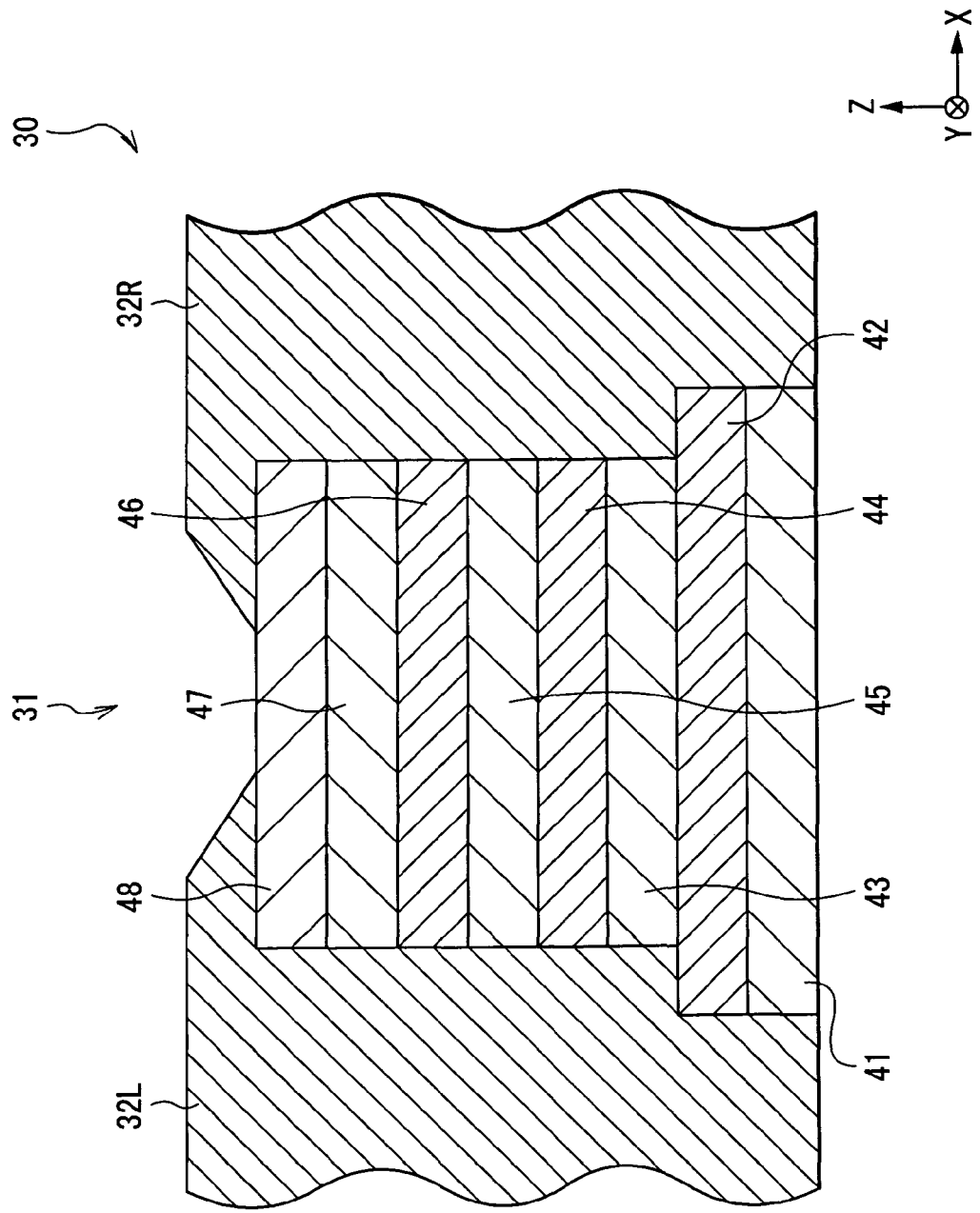
FIG. 13 is a sectional view of a third modification (lead overlay type structure) of the MR device according to the embodiment of the invention.

For example, as shown in FIG. 13, the MR device 30 may have a structure in which an end of each of the lead layers 32R and 32L partially overlaps the cap layer 48. The structure of the MR device 30 is commonly called as "lead overlay structure". In the lead overlay type MR device 30, a contact area between the laminate 31 and the lead layers 32R and 32L is increased, thereby the current efficiency of a sense current flowing through the laminate 31 is improved. Therefore, in the viewpoint of the current efficiency, the reproduction output can be improved.

<<Modification 4>>

Figure 14:
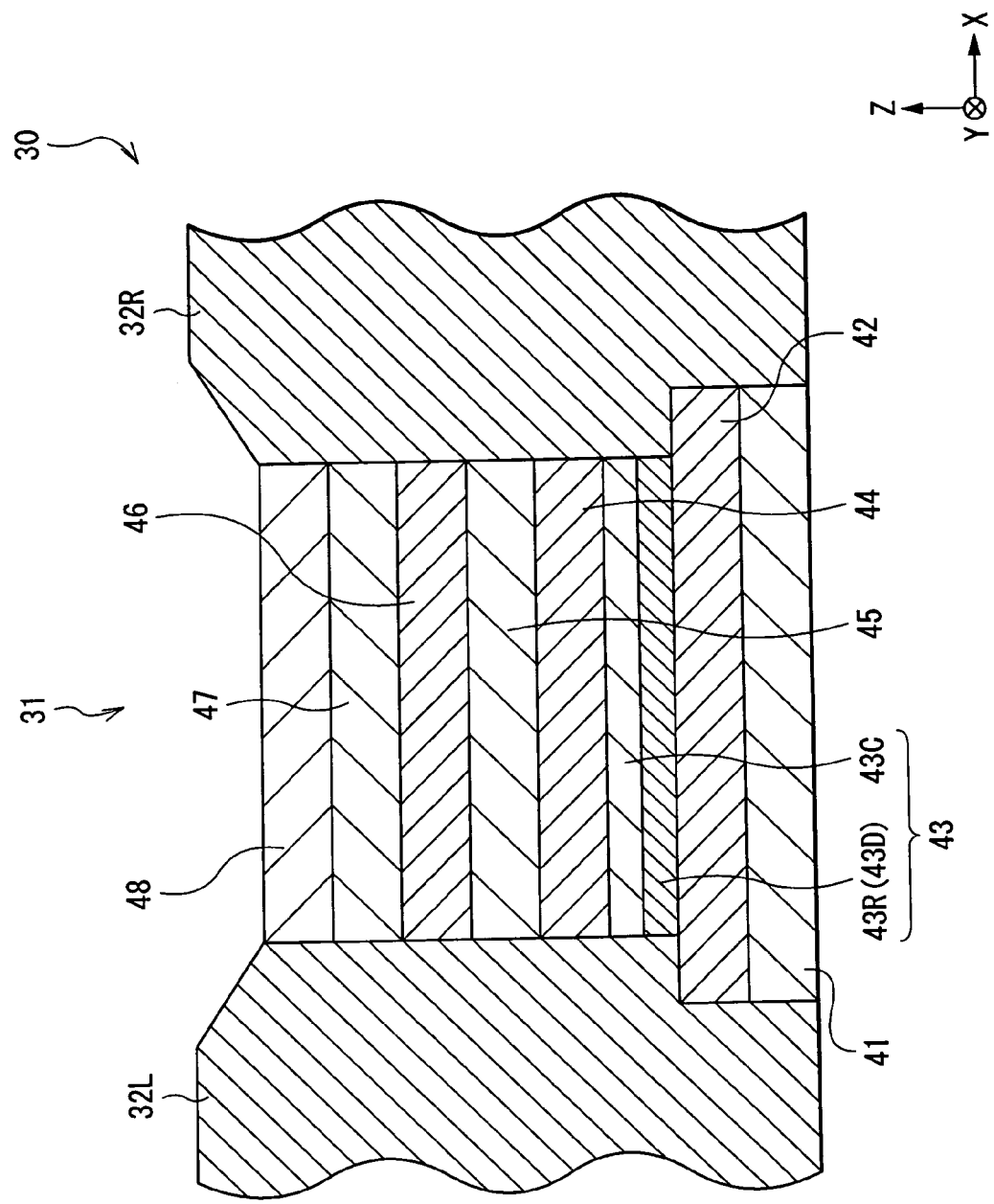
FIG. 14 is a sectional view of a fourth modification (specular spin-valve type structure) of the MR device according to the embodiment of the invention.

For example, as shown in FIG. 14, the MR device 30 may comprise the non-magnetic exchange coupling layer 43 with a two-layer structure in which a reflective layer 43R and a coupling layer 43C are laminated in this order. The structure of the MR device 30 is commonly called as "specular spin valve structure". The reflective layer 43R is provided mainly for specularly reflecting conduction electrons flowing through the laminate 31, and is made of, for example, a high reflective material such as copper oxide or the like. Further, the reflective layer 43R may also have a function of exchange coupling between the semi-hard magnetic layer 42 and the first ferromagnetic layer 44 as in the case of the coupling layer 43F. In the specular spin valve type MR device 30, conduction electrons are specularly reflected on the reflective layer 43R so as to improve the current efficiency of the sense current flowing through the laminate 31, thereby the reproduction output can be improved.

<<Modification 5>>

For example, the reflective layer 43R of the MR device 30 shown in FIG. 14 may be replaced with an electrically conductive layer 43D having a higher conductivity than the first ferromagnetic layer 44. The structure of the MR device 30 comprising the electrically conductive layer 43D is commonly called as "spin filter spin valve structure". The electrically conductive layer 43D is provided mainly for selectively scattering conduction electrons flowing through the laminate 31, and is made of, for example, a high conductive material such as copper or the like. In the spin filter spin valve type MR device 30, the conduction electrons are selectively scattered in the electrically conductive layer 43D so as to improve the current efficiency of the sense current flowing through the laminate 31, thereby the reproduction output can be improved.

<<Modification 6>>

Figure 15:
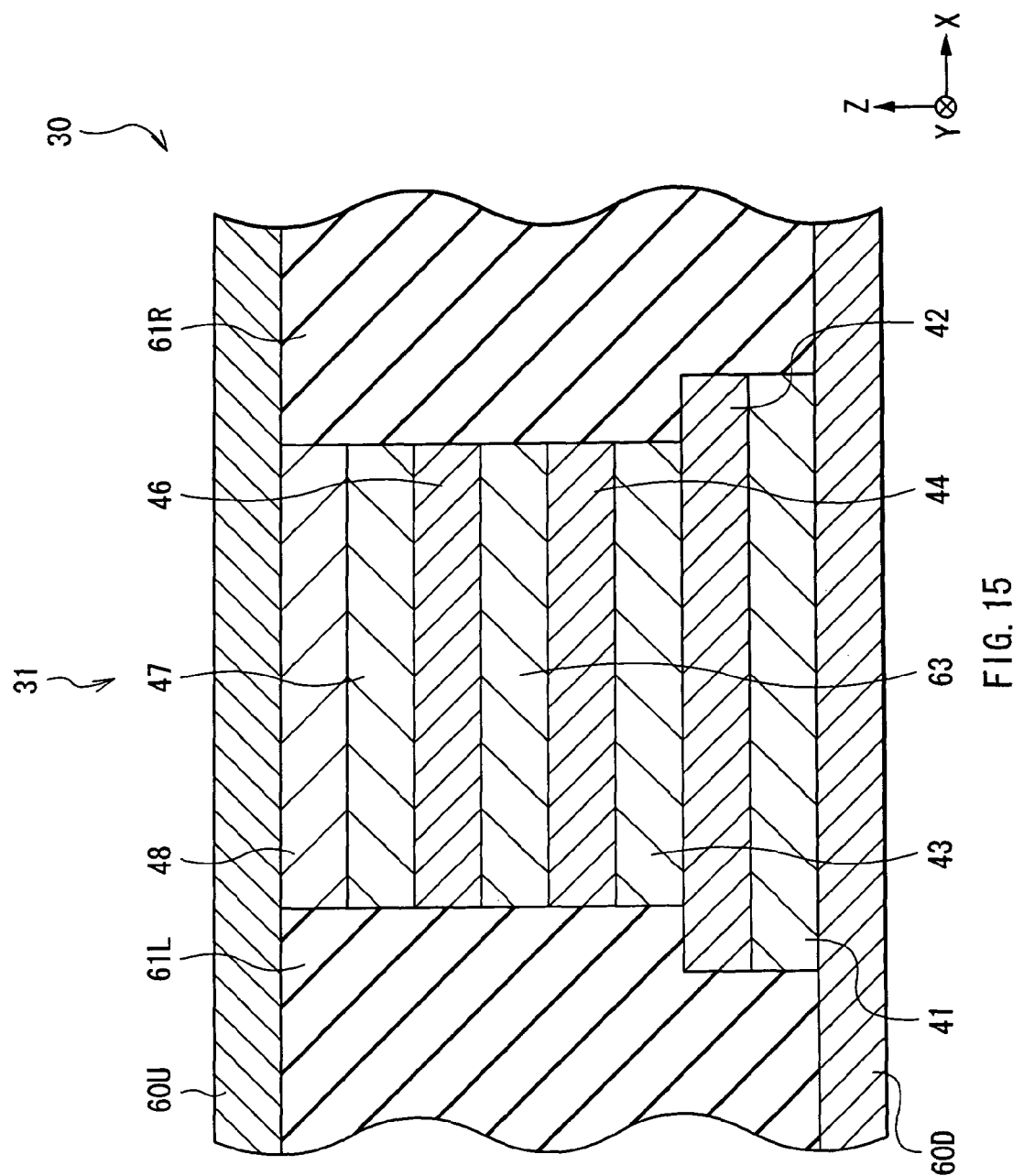
FIG. 15 is a sectional view of a sixth modification (tunnel junction type structure) of the MR device according to the embodiment of the invention.

For example, as shown in FIG. 15, the MR device 30 may have a structure in which two electrodes 60D and 60U are disposed adjacent to the bottom side of the base layer 41 and the top side of the cap layer 48 in the laminate 31, respectively, and both sides of the laminate 31 are buried by the insulating layers 61R and 61L. The structure of the MR device 30 is commonly called as "magnetic tunnel junction structure". The laminate 31 constituting the magnetic tunnel junction type MR device 30 includes a tunnel insulating layer 63 made of, for example, a non-magnetic insulating material such as alumina or the like with an extremely thin thickness instead of the non-magnetic layer 45. In the magnetic tunnel junction type MR device 30, when a voltage is applied to the laminate 31 by using electrodes 60D and 60U, the conduction electrons quantum-mechanically tunnel through the tunnel insulating layer 63 between the first ferromagnetic layer 44 and the second ferromagnetic layer 46 to generate a tunneling magnetoresistive effect. It is known that according to the magnetic tunnel junction structure, a larger magnetoresistive ratio than that of the spin valve structure can be obtained, so in the magnetic tunnel junction type MR device 30, a larger reproduction output than that in the above series of spin valve type MR device 30 can be obtained.

Next, a method of manufacturing the MR device 30 to which a method of manufacturing an electromagnetic transducer according to the embodiment is applied will be described below. FIGS. 16 through 21 show sectional views for describing steps of manufacturing the MR device 30. A method of manufacturing the abutted junction type MR device 30 shown in FIG. 9 will be described below. As materials, forming positions, structural characteristics and so on of each component have been already described above, they will not be further described.

The MR device 30 is manufactured through laminating each component in order mainly by using thin film processes including a pattern film formation technique by a liftoff process using plating, sputtering or the like, a patterning technique such as photolithography, an etching technique such as ion milling or the like, and so on.

Figure 16:
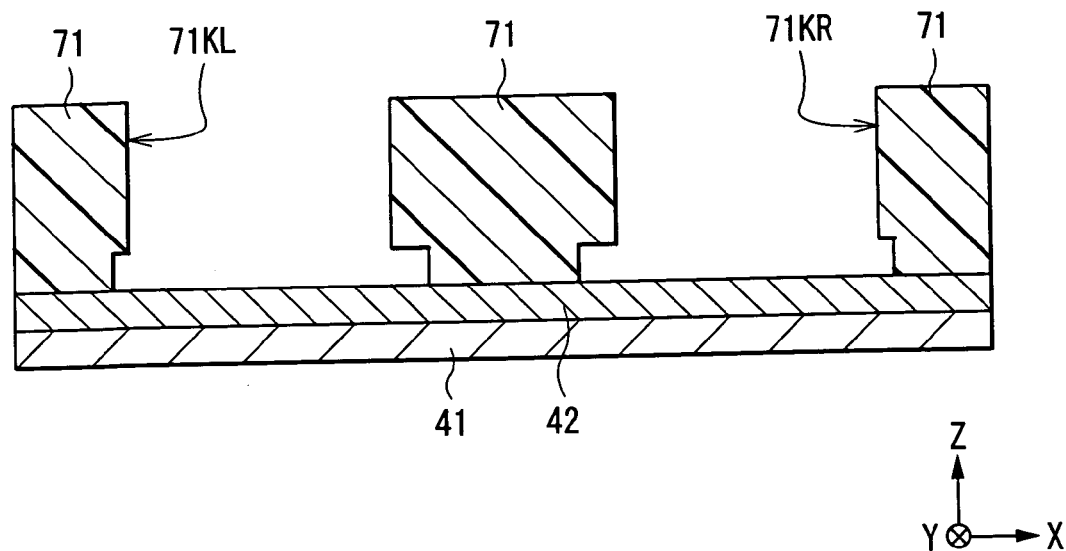
FIG. 16 is a sectional view for describing one step in a method of manufacturing the MR device according to the embodiment of the invention.

More specifically, at first, as shown in FIG. 16, the semi-hard magnetic layer 42 is formed on the base layer 41. Then, after a photoresist is applied to the semi-hard magnetic layer 42 to form a photoresist film (not shown), the photoresist film is exposed and developed to be patterned, thereby a mask layer 71 having two openings 71KR and 71KL is formed. When the mask layer 71 is formed, for example, in order to be capable of easily removing the mask layer 71 during the liftoff process which is a later process, the mask layer 71 preferably has an undercut portion in the neighborhood of an interface between the mask layer 71 and the semi-hard magnetic layer 42. Mask layers 72 and 73 which will be described later also have an undercut portion, as in the case of the mask layer 71.

Figure 17:
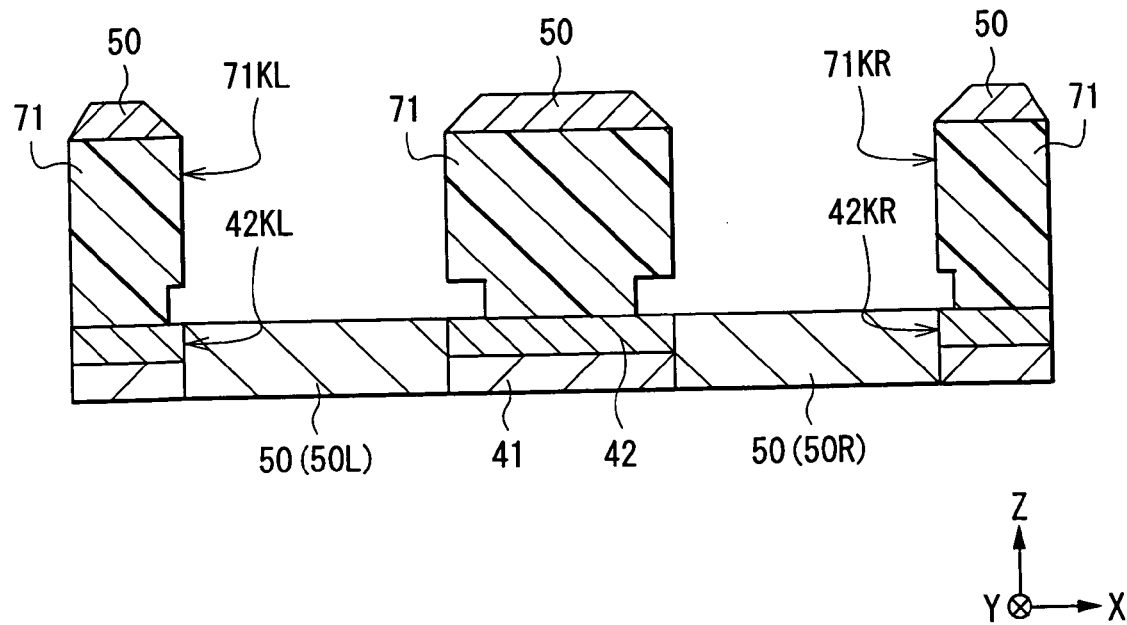
FIG. 17 is a sectional view for describing a step following the step of FIG. 16.

Next, the whole surface is etched by use of the mask layer 71. By etching, a portion of a laminate structure including the base layer 41 and the semi-hard magnetic layer 42 corresponding to the openings 71KR and 71KL of the mask layer 71 is selectively removed so as to form two openings 42KR and 42KL in the laminate structure, as shown in FIG. 17.

Then, the hard magnetic layer 50 is formed so as to be filled in the openings 42KR and 42KL. Thereby, as shown in FIG. 17, the hard magnetic layer 5OR is formed in the opening 42KR, and the hard magnetic layer 50L is formed in the opening 42KL. After that, the mask layer 71 and an excess portion of the hard magnetic layer 50 deposited on the mask layer 71 are removed by peeling the used mask layer 71 (that is, the liftoff process).

Figure 18:
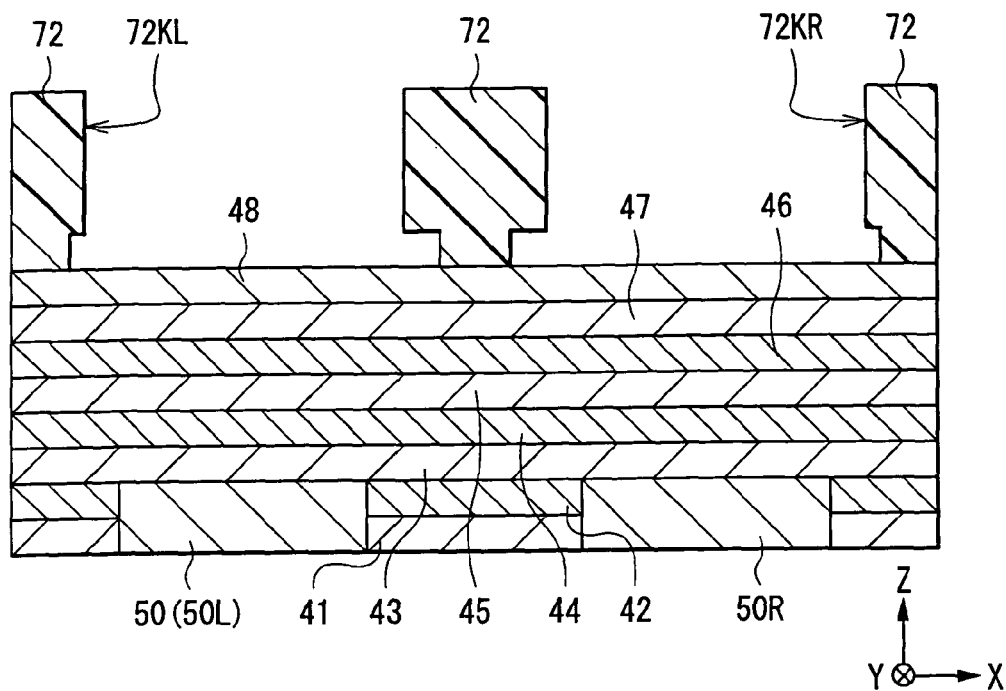
FIG. 18 is a sectional view for describing a step following the step of FIG. 17.

Next, as shown in FIG. 18, after the non-magnetic exchange coupling layer 43, the first ferromagnetic layer 44, the non-magnetic layer 45, the second ferromagnetic layer 46, the antiferromagnetic layer 47 and the cap layer 48 are laminated in this order on the laminate structure including the base layer 41 and the semi-hard magnetic layer 42, the mask layer 72 having two openings 72KR and 72KL is formed on the cap layer 48. The mask layer 72 is formed so that, for example, the width of a portion of the mask layer 72 disposed between the openings 72KR and 72KL is narrower than a portion of the mask layer 71 which is formed in a previous step and is disposed between 71KR and 71KL.

Figure 19:
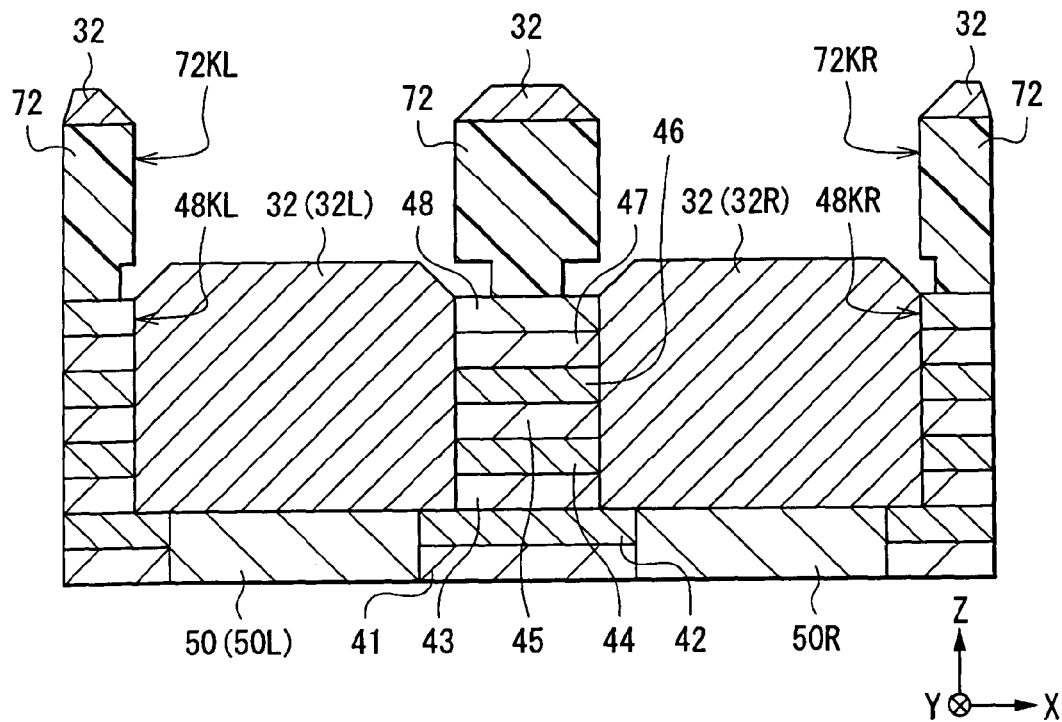
FIG. 19 is a sectional view for describing a step following the step of FIG. 18.

Then, the whole surface is etched by use of the mask layer 72 so as to selectively form two openings 48KR and 48KL in a laminate structure from the non-magnetic exchange coupling layer 43 through the cap layer 48, as shown in FIG. 19.

Next, as shown in FIG. 19, the lead layer 32 is formed so as to be filled in the openings 48KR and 48KL, thereby the lead layer 32R is formed in the opening 48KR, and the lead layer 32L is formed in the opening 48KL. After that, the used mask layer 72 is lifted off.

Figure 20:
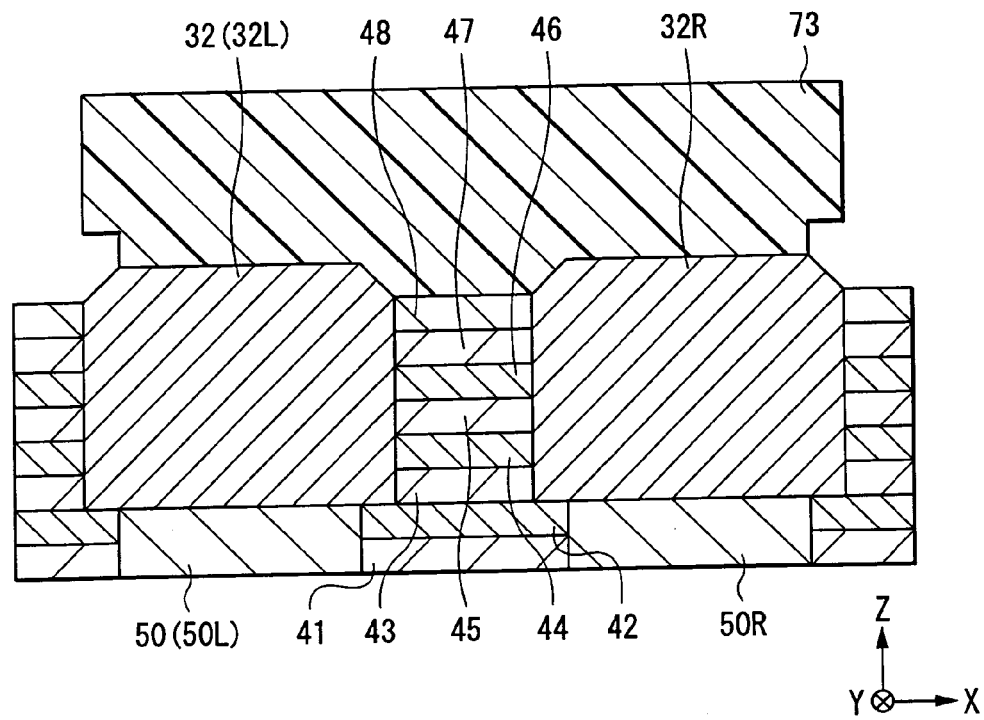
FIG. 20 is a sectional view for describing a step following the step of FIG. 19.

Then, as shown in FIG. 20, the mask layer 73 is selectively formed so as to be laid over a region from the lead layer 32R to the lead layer 32L in a width direction in the laminate structure from the non-magnetic exchange coupling layer 43 through the cap layer 48.

Figure 21:
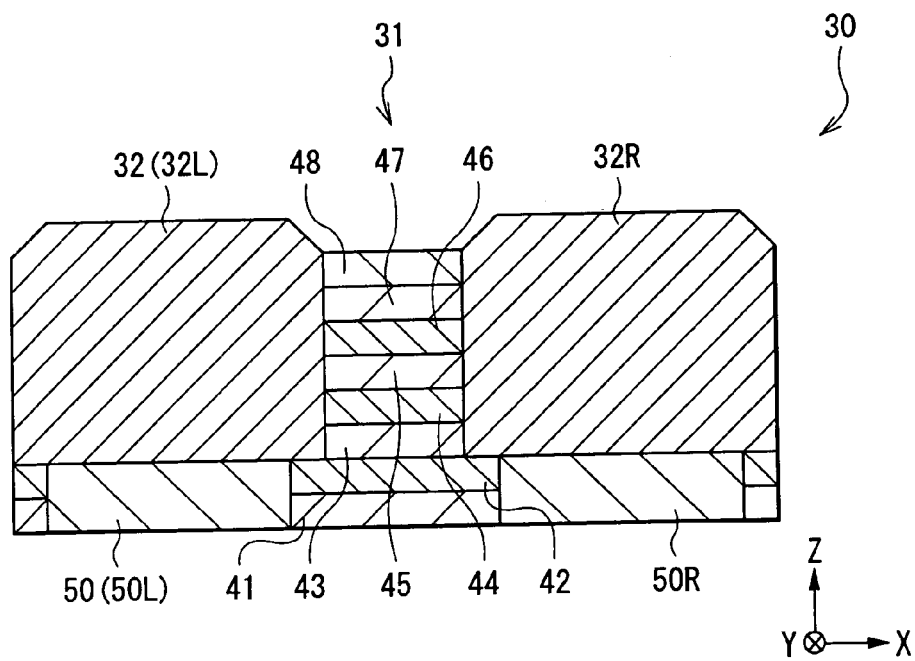
FIG. 21 is a sectional view for describing a step following the step of FIG. 20.

Finally, the whole surface is etched by use of the mask layer 73 so as to remove an unnecessary portion of the laminate structure from the base layer 41 through the cap layer 48, thereby, as shown in FIG. 21, the abutted junction type MR device 30 comprising the laminate 31 in which the base layer 41 through the cap layer 48 are laminated is completed.

Next, characteristic effects relating to the method of manufacturing the MR device 30 will be described below.

In the method of manufacturing the MR device 30 according to the embodiment, as a technique for forming a device structure including the laminate 31 in which the semi-hard magnetic layer 42 and the first ferromagnetic layer 44 are exchange-coupled to each other through the non-magnetic exchange coupling layer 43, only the existing thin film processes including the liftoff process are used, so the MR device 30 in which the magnetic domain of the first ferromagnetic layer 44 is controlled by use of exchange coupling can be easily manufactured.

The invention is described referring to the embodiment, but the invention is not limited to the above embodiments, and can be variously modified. For example, in the above embodiment, the case where the invention is applied to the thin film magnetic head for recording and reproducing is described, but the invention is applicable to a thin film magnetic head for reproducing only. Moreover, for example, the thin film magnetic head for recording and reproducing may have a structure in which the reproducing head portion and the recording head portion are inversely laminated, and the thin film magnetic head for recording and reproducing may have not only a two layer structure including the reproducing head portion and the recording head portion, but also a three or more layer structure including a plurality of reproducing head portions or a plurality of recording head portions.

Moreover, for example, in the embodiment, the case where the invention is applied to the thin film magnetic head for magnetic reproduction is described, but the invention is not limited to this. For example, the invention is applicable to a sensor for detecting a magnetic field (for example, acceleration sensor), a memory for recording a magnetic signal, or the like.

As described above, in the electromagnetic transducer laminate, the electromagnetic transducer, the thin film magnetic head, the magnetic head assembly and the magnetic reproducing apparatus according to the invention, the semi-hard magnetic layer and the first ferromagnetic layer are laminated with the non-magnetic exchange coupling layer in between, and the semi-hard magnetic layer and the first ferromagnetic layer are exchange-coupled to each other through the non-magnetic exchange coupling layer, so the bias distribution in the first ferromagnetic layer becomes uniform, thereby the first ferromagnetic layer is brought into a single magnetic domain state. Therefore, the magnetization direction of the first ferromagnetic layer can be easily rotated, thereby the magnetoresistive ratio can be secured, so even if the size of the electromagnetic transducer laminate is reduced, a sufficient reproduction output can be obtained.

Moreover, in the method of manufacturing an electromagnetic transducer according to the invention, as a technique for forming a laminate structure in which the semi-hard magnetic layer and the first ferromagnetic layer are exchange-coupled to each other through the non-magnetic exchange coupling layer, only existing thin film processes including the liftoff process are used, so the electromagnetic transducer of the invention which can contribute to securing the reproduction output can be easily manufactured by use of exchange coupling.

Further, in the electromagnetic transducer laminate according to the invention, the width of the semi-hard magnetic layer is equal to or larger than the width of the first ferromagnetic layer, so unlike the case where the width of the semi-hard magnetic layer is smaller than the width of the first ferromagnetic layer, the bias distribution of the first ferromagnetic layer can become uniform.

Obviously many modifications and variations of the present invention are possible in the light of the above teachings. It is therefore to be understood that within the scope of the appended claims the invention may be practiced otherwise than as specifically described.

What is claimed is:

1. An electromagnetic transducer laminate, comprising:
a laminate structure including a first ferromagnetic layer having a pair of facing surfaces, a non-magnetic layer being disposed adjacent to one of the surfaces of the first ferromagnetic layer, a second ferromagnetic layer being disposed adjacent to the non-magnetic layer, and an antiferromagnetic layer being disposed to adjacent to the second ferromagnetic layer;
a non-magnetic exchange coupling layer being disposed adjacent to the other surface of the first ferromagnetic layer; and
a semi-hard magnetic layer being disposed adjacent to the non-magnetic exchange coupling layer, and being exchange-coupled to the first ferromagnetic layer through the non-magnetic exchange coupling layer, wherein a width in a longitudinal direction of the semi-hard magnetic layer is larger than a width in a longitudinal direction of the first ferromagnetic layer.

2. An electromagnetic transducer laminate according to claim 1, wherein the semi-hard magnetic layer functions as a first magnetic domain control layer for controlling a magnetic domain of the first ferromagnetic layer.

3. An electromagnetic transducer laminate according to claim 1, wherein the second ferromagnetic layer has a laminate structure including two magnetization directions opposite to each other.

4. An electromagnetic transducer laminate according to claim 1, wherein the non-magnetic exchange coupling layer includes a reflective layer for reflecting conduction electrons.

5. An electromagnetic transducer laminate according to claim 1, wherein the non-magnetic exchange coupling layer includes an electrically conductive layer having a higher conductivity than the first ferromagnetic layer.

6. An electromagnetic transducer, comprising:
an electromagnetic transducer laminate according to claim 1; and
a lead layer for supplying a current to the electromagnetic transducer laminate.

7. An electromagnetic transducer according to claim 6, further comprising:
a hard magnetic layer being disposed adjacent to a side of at least a semi-hard magnetic layer in the electromagnetic transducer laminate, and functioning as a second magnetic domain control layer for controlling a magnetic domain of a first ferromagnetic layer in the electromagnetic transducer laminate.

8. a thin film magnetic head, comprising:
an electromagnetic transducer according to claim 6, wherein the thin film magnetic head magnetically reproduces information.

9. a magnetic head assembly, comprising:
a head slider having a thin film magnetic head according to claim 8 formed thereon; and
a slider supporting mechanism supporting the slider head.

10. a magnetic reproducing apparatus, comprising:
a magnetic head assembly according to claim 9; and
a recording medium where information is magnetically reproduced by using the magnetic head assembly.

11. a method of manufacturing an electromagnetic transducer, the electromagnetic transducer comprising an electromagnetic transducer laminate according to claim 1 and a lead layer for supplying a current to the electromagnetic transducer laminate,
wherein a method of manufacturing the electromagnetic transducer laminate comprises the steps of:
forming a non-magnetic exchange coupling layer so as to be disposed adjacent to one surface of a first ferromagnetic layer, and
forming a semi-hard magnetic layer so as to be disposed adjacent to the non-magnetic exchange coupling layer, thereby being exchange-coupled between the semi-hard magnetic layer and the first ferromagnetic layer through the non-magnetic exchange coupling layer.

12. An electromagnetic transducer laminate, comprising:
a spin valve structure including a free layer, a non-magnetic layer being disposed adjacent to the free layer, a pinned layer being disposed so as to face the free layer with the non-magnetic layer in between, and having a magnetization direction fixed in a predetermined direction, and a pinning layer being disposed adjacent to the pinned layer, and being provided for fixing the magnetization direction of the pinned layer;
a non-magnetic exchange coupling layer being disposed adjacent to the free layer on a side opposite to a side where the non-magnetic layer is disposed; and
a magnetic domain control layer being disposed so as to face the free layer with the non-magnetic exchange coupling layer in between, and being exchange-coupled to the free layer so as to control a magnetic domain of the free layer, wherein a width in a longitudinal direction of the magnetic domain control layer is larger than a width in a longitudinal direction of the free layer.

13. An electromagnetic transducer, comprising:
an electromagnetic transducer laminate according to claim 12; and
a lead layer for supplying a current to the electromagnetic transducer laminate.

14. An electromagnetic transducer according to claim 13, further comprising:
a hard magnetic layer being disposed adjacent to a side of at least a semi-hard magnetic layer in the electromagnetic transducer laminate, and functioning as a second magnetic domain control layer for controlling a magnetic domain of a first ferromagnetic layer in the electromagnetic transducer laminate.

15. a thin film magnetic head, comprising:
an electromagnetic transducer according to claim 13, wherein the thin film magnetic head magnetically reproduces information.

16. a magnetic head assembly, comprising:
a head slider having a thin film magnetic head according to claim 15 formed thereon; and
a slider supporting mechanism supporting the slider head.

17. a magnetic reproducing apparatus, comprising:
a magnetic head assembly according to claim 16; and
a recording medium where information is magnetically reproduced by using the magnetic head assembly.

18. a method of manufacturing an electromagnetic transducer, the electromagnetic transducer comprising an electromagnetic transducer laminate according to claim 12 and a lead layer for supplying a current to the electromagnetic transducer laminate,
wherein a method of manufacturing the electromagnetic transducer laminate comprises the steps of:
forming a non-magnetic exchange coupling layer so as to be disposed adjacent to one surface of a first ferromagnetic layer, and
forming a semi-hard magnetic layer so as to be disposed adjacent to the non-magnetic exchange coupling layer, thereby being exchange-coupled between the semi-hard magnetic layer and the first ferromagnetic layer through the non-magnetic exchange coupling layer.

19. An electromagnetic transducer laminate, comprising:
a laminate structure including a first ferromagnetic layer having a pair of facing surfaces, a tunnel insulating layer being disposed adjacent to one of the surfaces of the first ferromagnetic layer, and being capable of tunneling conduction electrons therethrough, a second ferromagnetic layer being disposed adjacent to the tunnel insulating layer, and an antiferromagnetic layer being disposed adjacent to the second ferromagnetic layer;
a non-magnetic exchange coupling layer being disposed adjacent to the other surface of the first ferromagnetic layer; and
a semi-hard magnetic layer being disposed adjacent to the non-magnetic exchange coupling layer, and being exchange-coupled to the first ferromagnetic layer through the non-magnetic exchange coupling layer, wherein a width in a longitudinal direction of the semi-hard magnetic layer is larger than a width in a longitudinal direction of the first ferromagnetic layer.

20. An electromagnetic transducer, comprising:
an electromagnetic transducer laminate according to claim 19; and
a lead layer for supplying a current to the electromagnetic transducer laminate.

21. An electromagnetic transducer according to claim 20, further comprising:
a hard magnetic layer being disposed adjacent to a side of at least a semi-hard magnetic layer in the electromagnetic transducer laminate, and functioning as a second magnetic domain control layer for controlling a magnetic domain of a first ferromagnetic layer in the electromagnetic transducer laminate.

22. a thin film magnetic head, comprising:
an electromagnetic transducer according to claim 20, wherein the thin film magnetic head magnetically reproduces information.

23. a magnetic head assembly, comprising:
a head slider having a thin film magnetic head according to claim 22 formed thereon; and
a slider supporting mechanism supporting the slider head.

24. a magnetic reproducing apparatus, comprising:
a magnetic head assembly according to claim 23; and
a recording medium where information is magnetically reproduced by using the magnetic head assembly.

25. a method of manufacturing an electromagnetic transducer, the electromagnetic transducer comprising an electromagnetic transducer laminate according to claim 19 and a lead layer for supplying a current to the electromagnetic transducer laminate,
wherein a method of manufacturing the electromagnetic transducer laminate comprises the steps of:
forming a non-magnetic exchange coupling layer so as to be disposed adjacent to one surface of a first ferromagnetic layer, and
forming a semi-hard magnetic layer so as to be disposed adjacent to the non-magnetic exchange coupling layer, thereby being exchange-coupled between the semi-hard magnetic layer and the first ferromagnetic layer through the non-magnetic exchange coupling layer.

* * * * *